Jan. 16, 1934.  C. MÜLLER  1,943,898
METHOD AND MEANS FOR ANALYZING AND TRANSLATING ENERGY FORMS
Filed Oct. 1, 1928   11 Sheets-Sheet 3
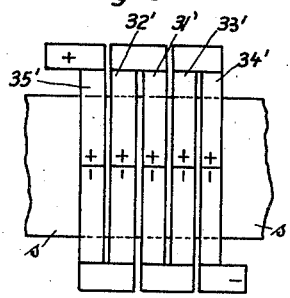
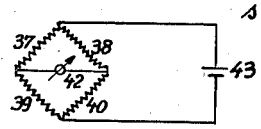
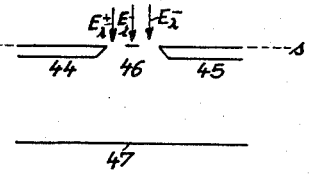
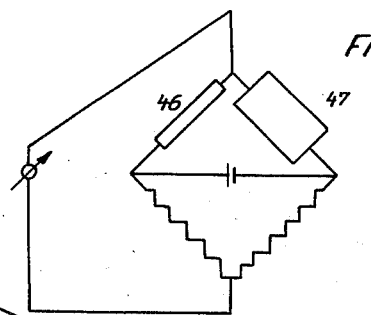
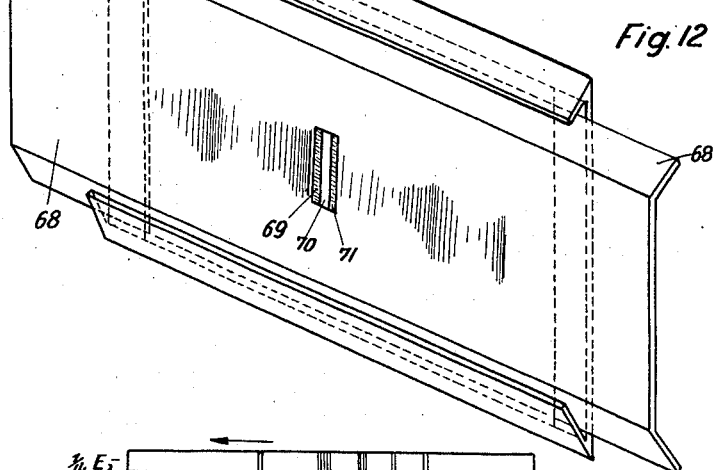
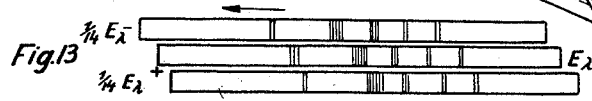
CARL MÜLLER
Inventor
HIS ATTORNEY Jan. 16, 1934.  C. MÜLLER  1,943,898
METHOD AND MEANS FOR ANALYZING AND TRANSLATING ENERGY FORMS
Filed Oct. 1, 1928  11 Sheets-Sheet 4
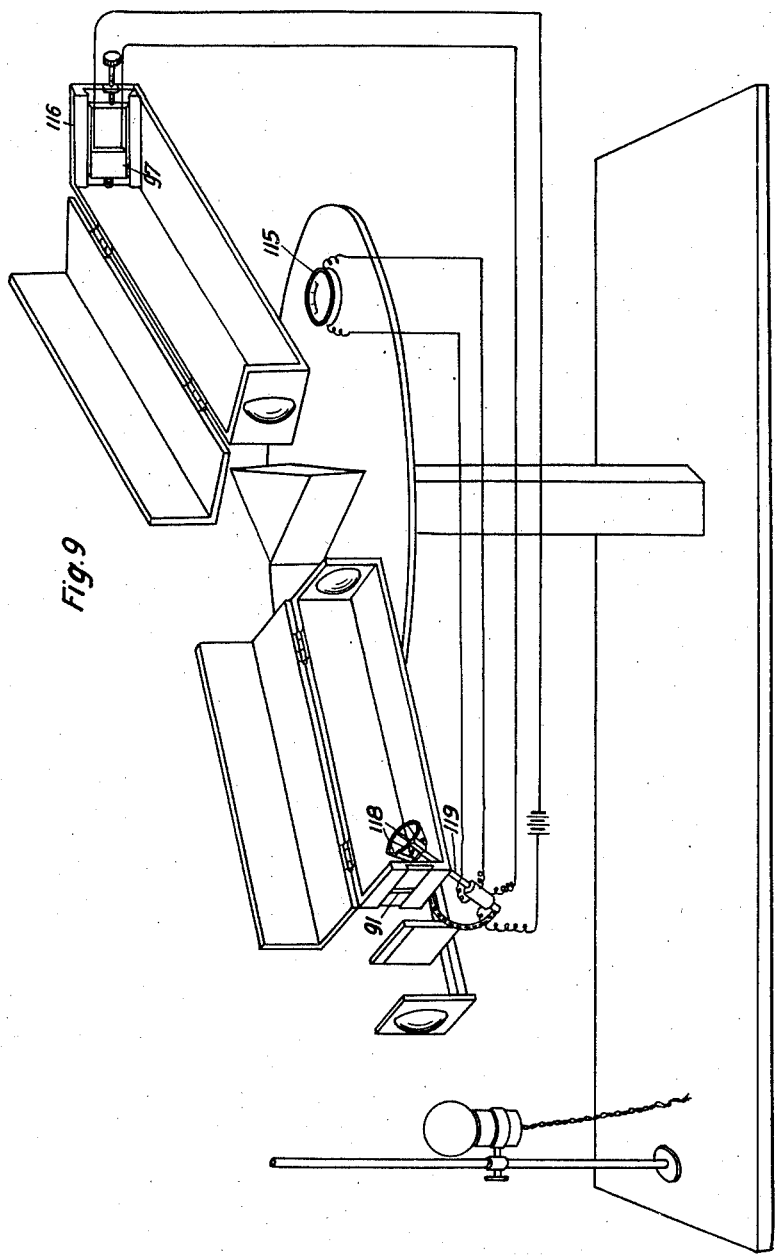

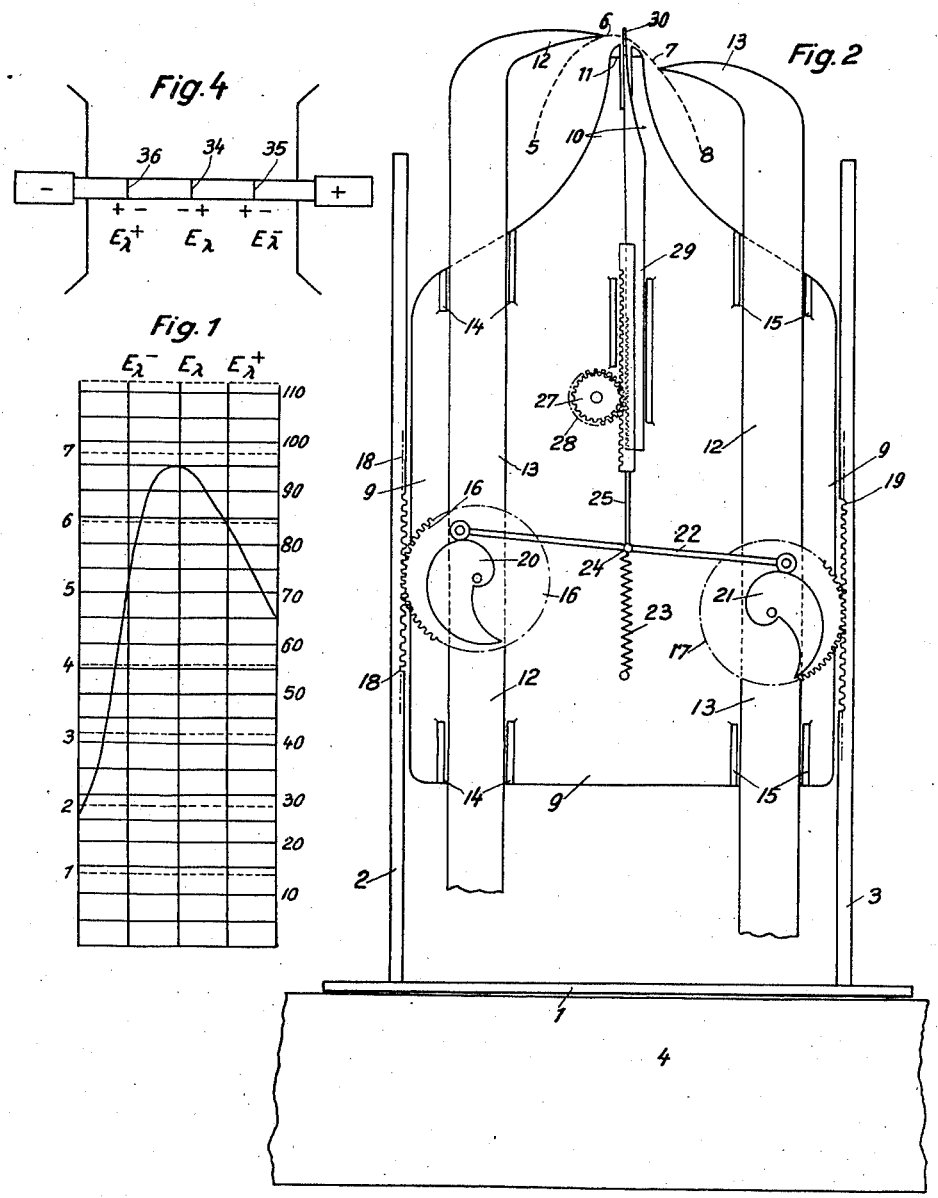

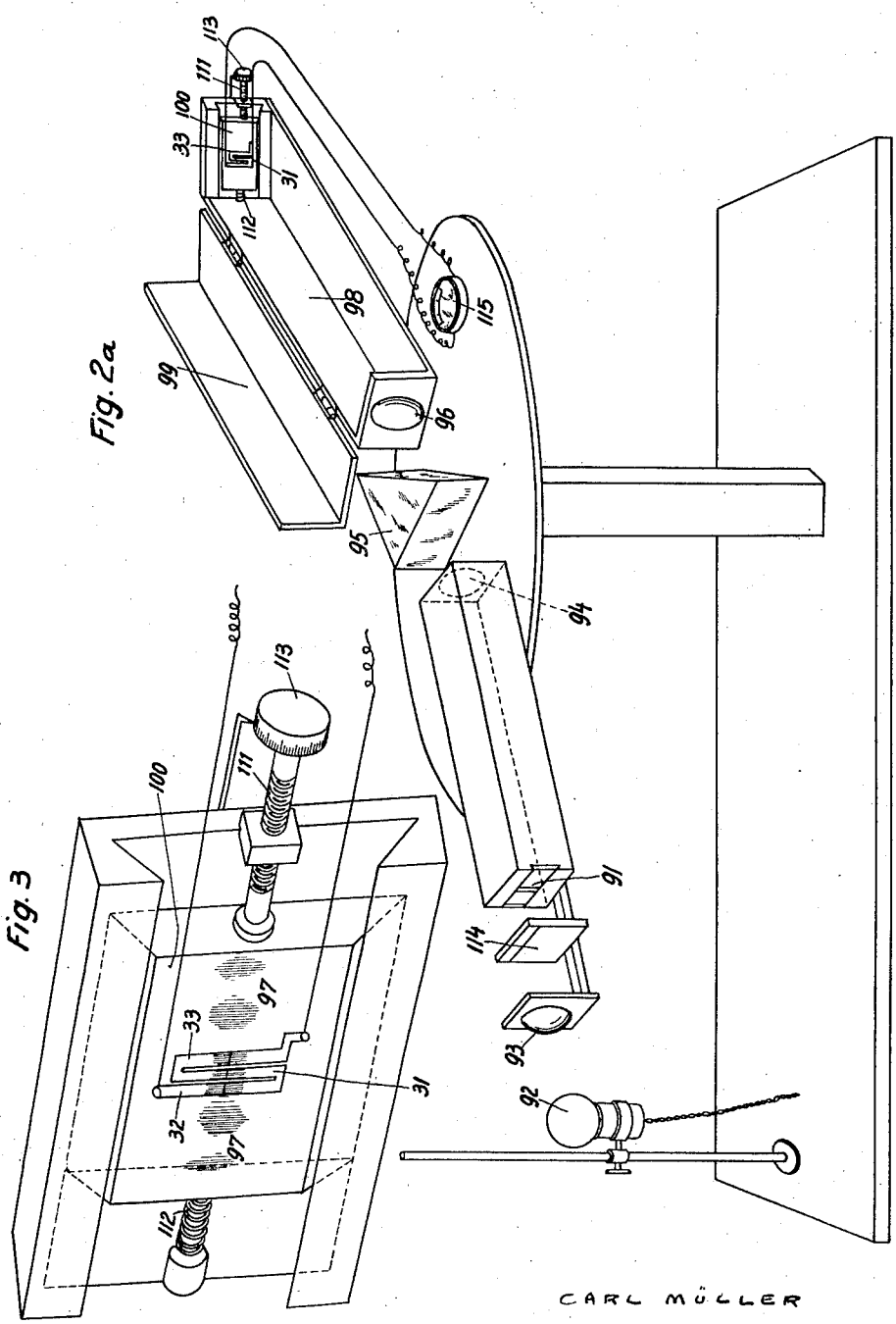

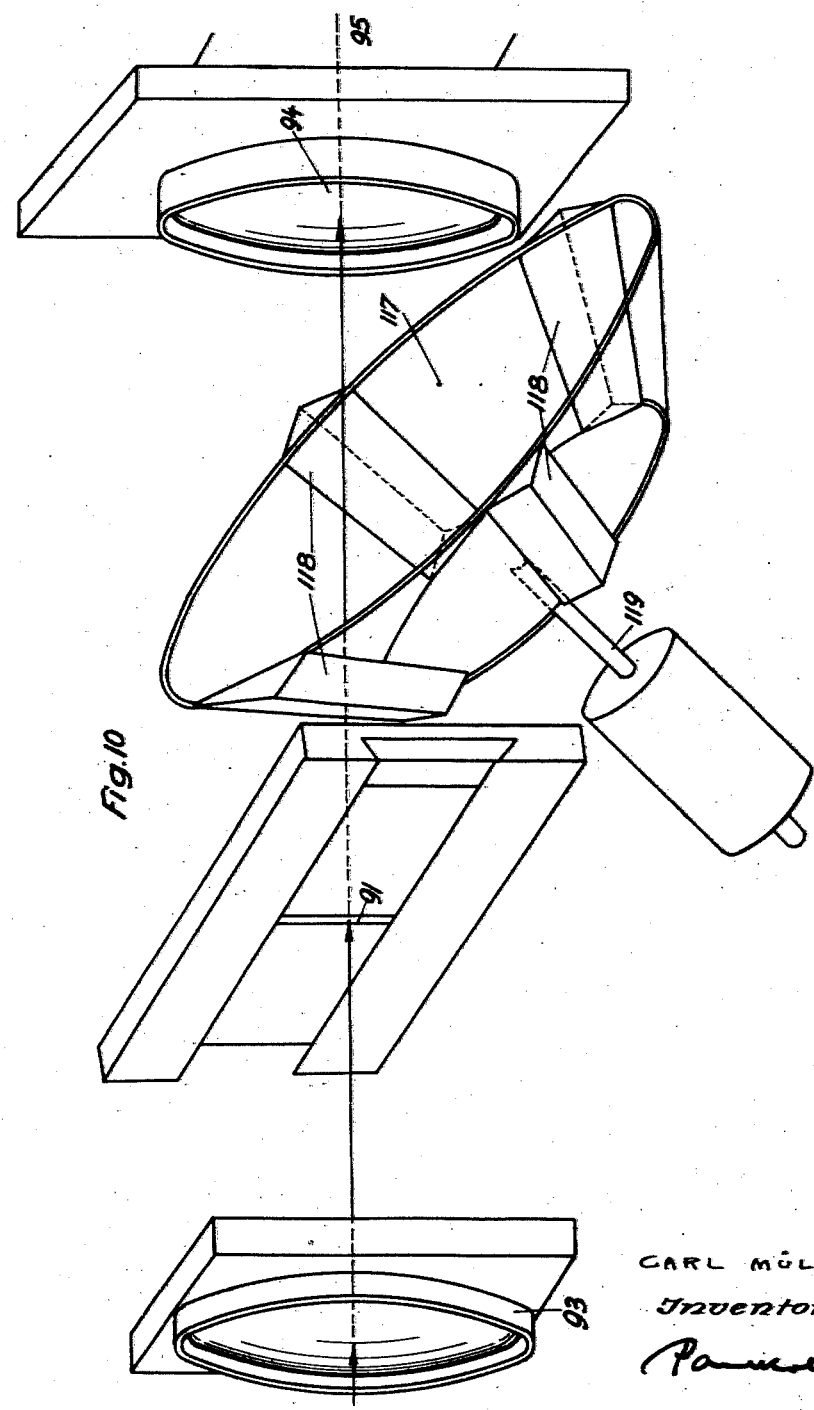

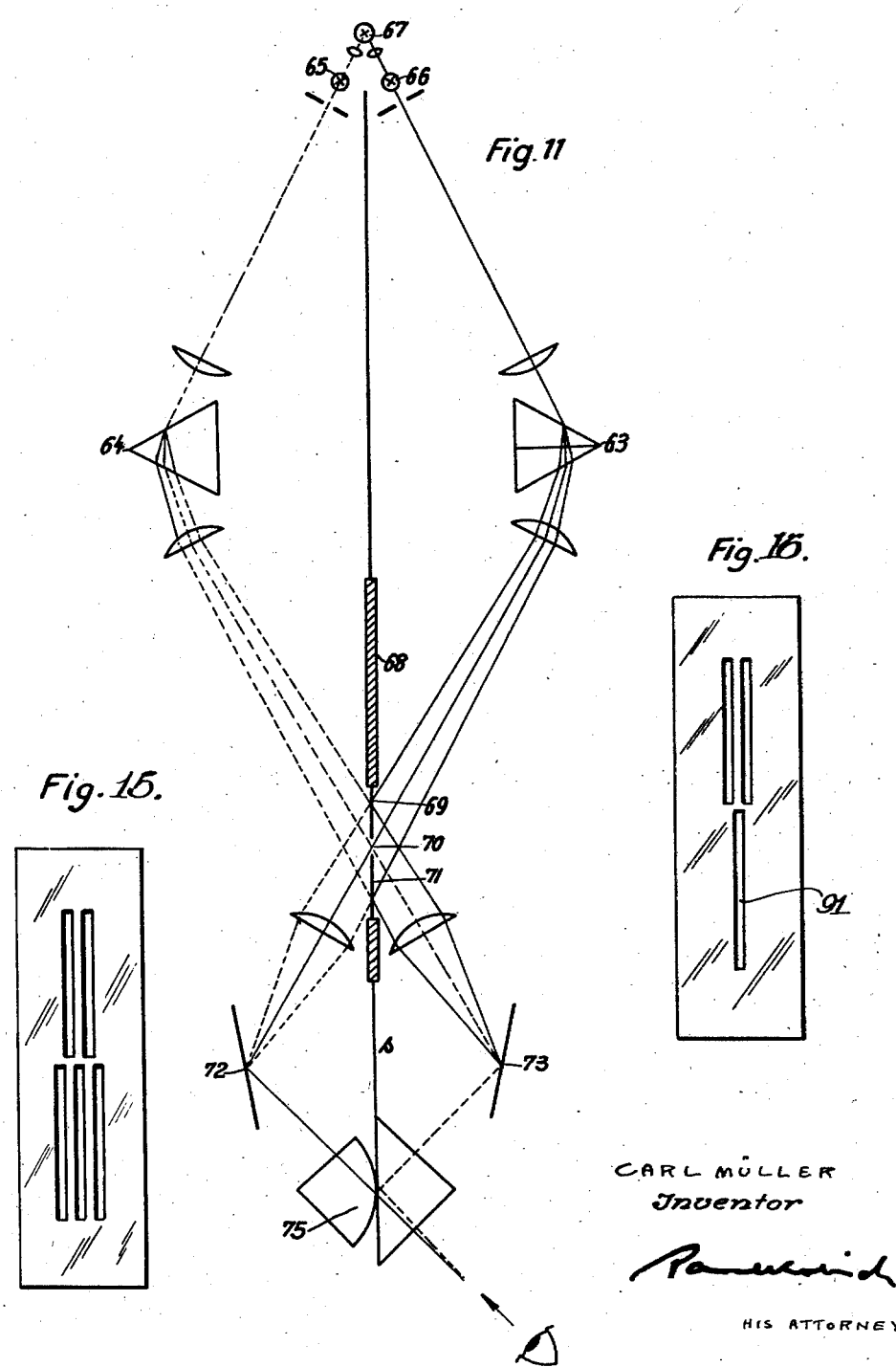

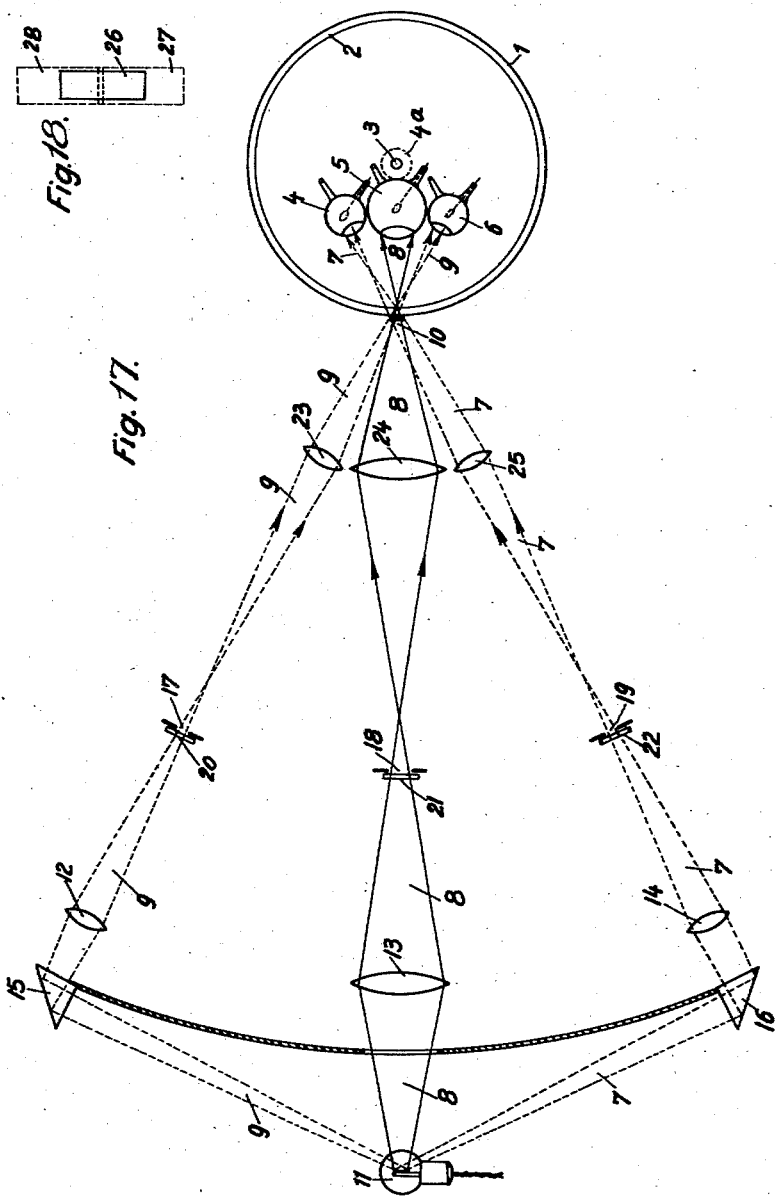

Jan. 16, 1934.  C. MÜLLER  1,943,898
METHOD AND MEANS FOR ANALYZING AND TRANSLATING ENERGY FORMS
Filed Oct. 1, 1928  11 Sheets-Sheet 8
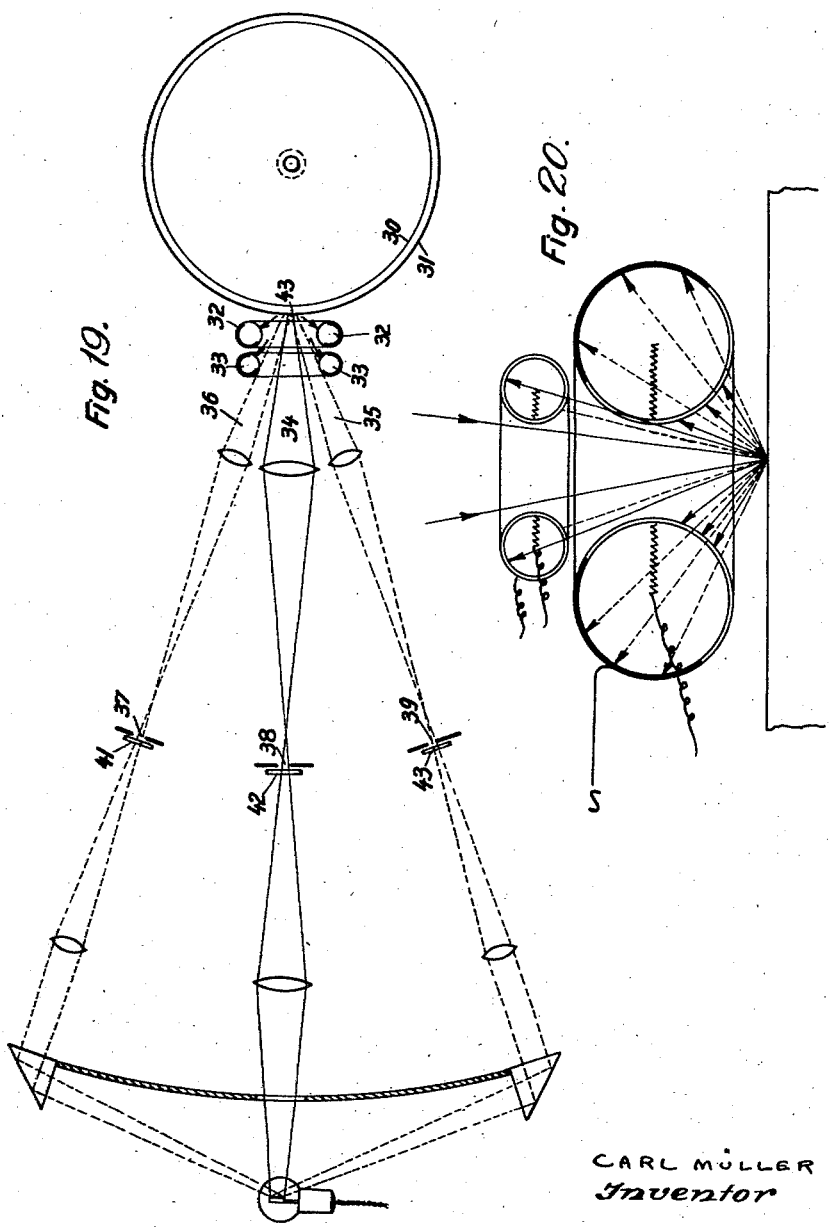
CARL MÜLLER
Inventor Jan. 16, 1934.  C. MÜLLER  1,943,898
METHOD AND MEANS FOR ANALYZING AND TRANSLATING ENERGY FORMS
Filed Oct. 1, 1928    11 Sheets-Sheet 9

CARL MÜLLER
Inventor

HIS ATTORNEY

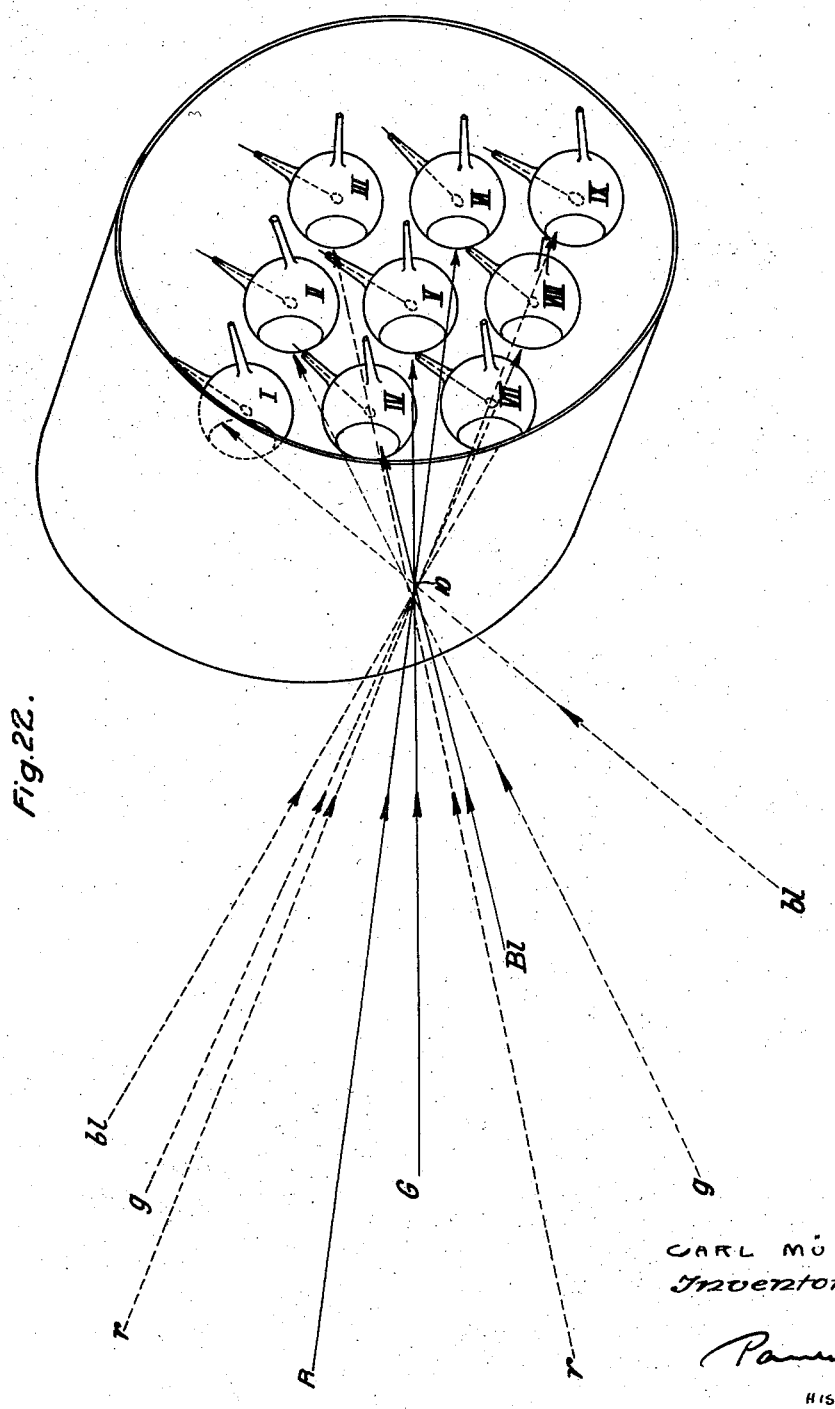

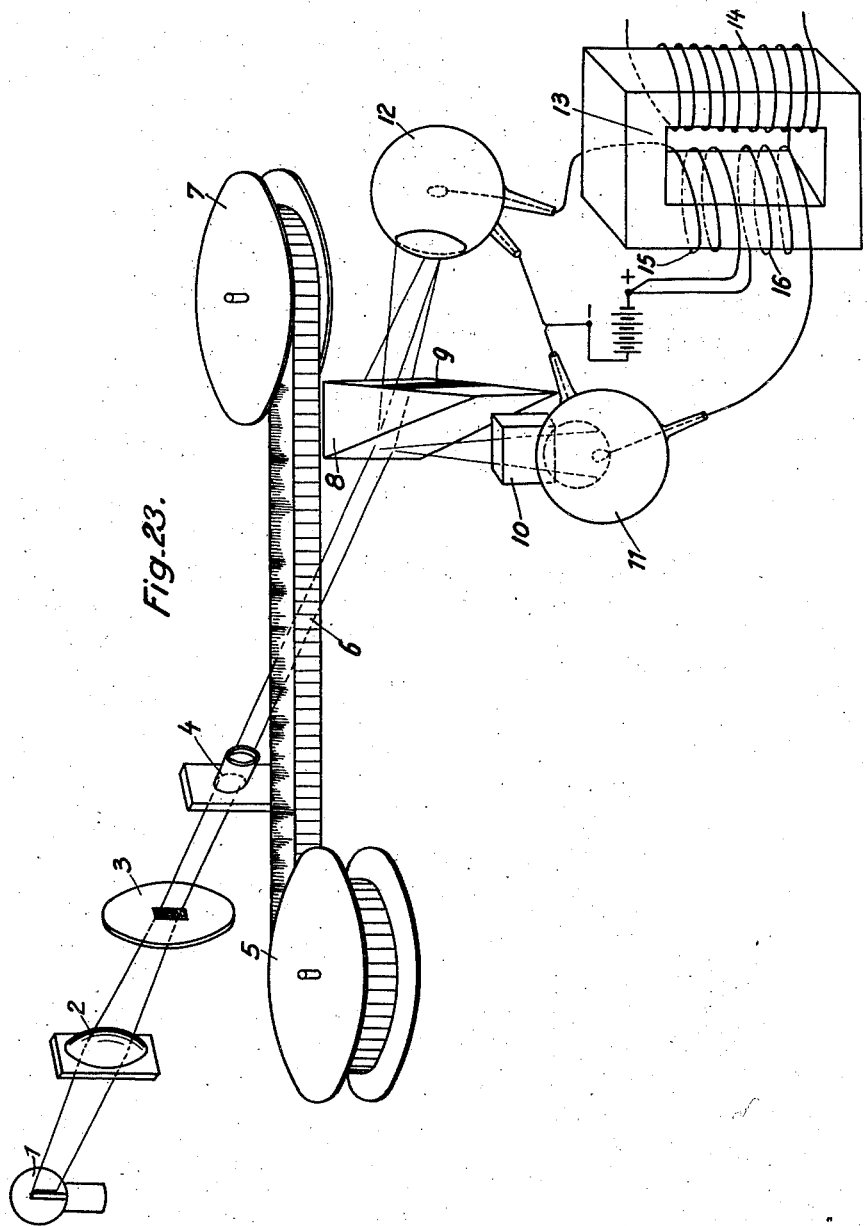

Patented Jan. 16, 1934

1,943,898

UNITED STATES PATENT OFFICE

1,943,898

METHOD AND MEANS FOR ANALYZING AND TRANSLATING ENERGY FORMS

Carl Müller, Berlin-Charlottenburg, Germany

Application October 1, 1928, Serial No. 309,373, and in Germany October 29, 1926

17 Claims. (Cl. 88—14)

My invention relates to a method of translating by process of analysis, spatially or temporally successive energy forms into other energy forms. The present application is a continuation in part of my application Serial No. 229,255, filed October 27, 1927.

The objects of my invention, the features of novelty, and various manners in which the same may be performed, will appear from the description following hereinafter which, however, is intended to explain and not to limit the scope of the invention defined in the appended claims.

In the drawing, Fig. 1 represents a scale for correcting spectroscope readings;

Fig. 2 is a diagrammatic representation of a mechanical device for correcting spectroscope readings;

Figs. 2a and 3 are perspective and partly diagrammatic views of spectroscopic measuring devices comprising thermal elements;

Fig. 4 shows a modified thermo-element for the apparatus of Figs. 2a and 3;

Fig. 5 illustrates a thermal element adapted to realize the teaching of a certain formula 7 set forth in the specification;

Fig. 6 is a circuit diagram of a Wheatstone bridge connection for bolometer elements;

Figure 21:
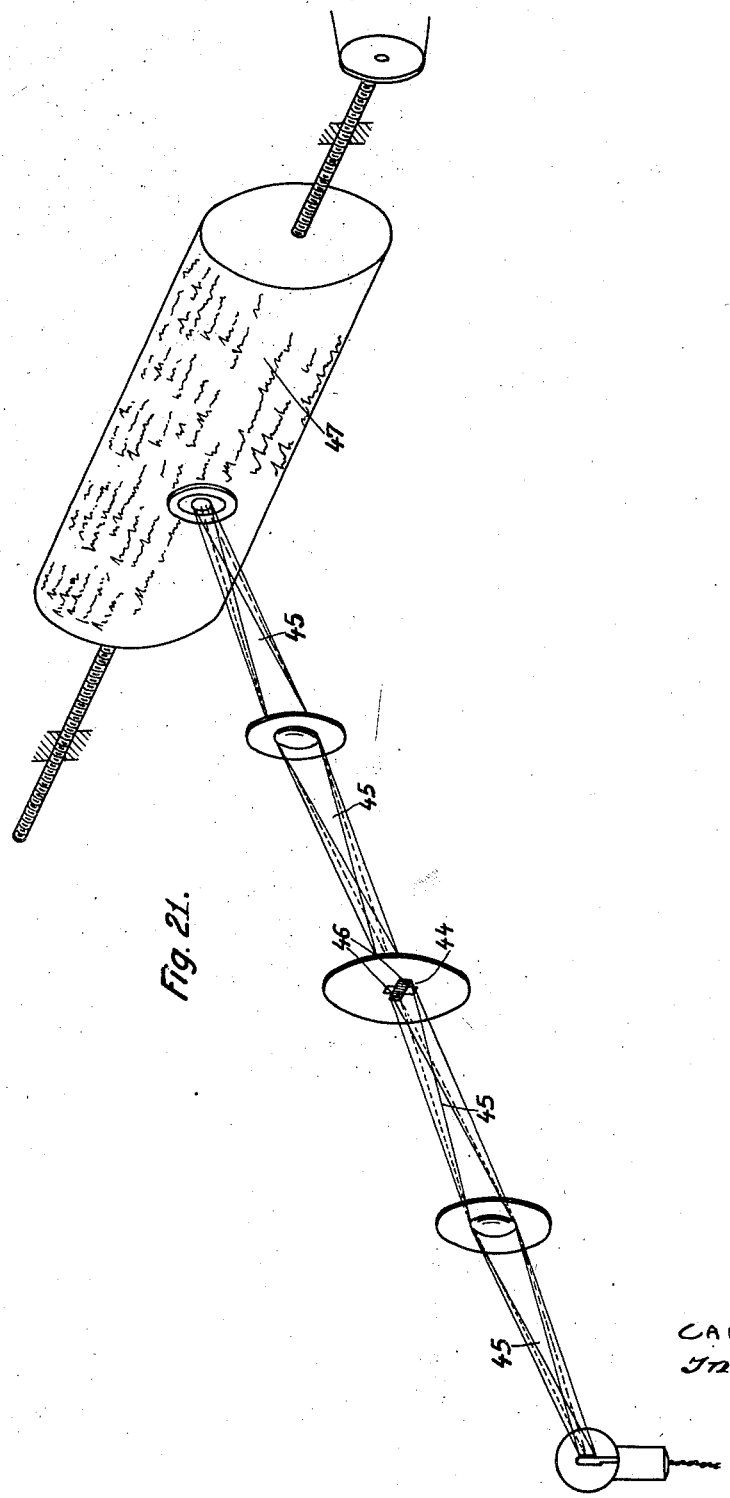

Figs. 7 and 8 diagrammatically illustrate thermic and electric compensating devices which may be substituted for those shown in the previous figures;

Figs. 9 and 10 illustrate in perspective (partly diagrammatically) an apparatus like that in Fig. 2a, but in which the spectrum may be intermittently shifted;

Fig. 11 is a diagrammatic plan view of a photometer for the visual comparison of spectra;

Fig. 12 is a perspective view of part of Fig. 11;

Figs. 13 and 14 illustrate diagrammatically negative and positive spectrum records;

Figs. 15 and 16 show an alternative form of multiple slot;

Fig. 17 diagrammatically illustrates one application of my invention to picture transmission (sending station);

Fig. 18 is a diagrammatic illustration of the overlap of the scanning lights;

Figs. 19 and 20 diagrammatically illustrate a modified form of the system shown in Fig. 17;

Fig. 21 diagrammatically illustrates another embodiment of the invention to picture transmission;

Fig. 22 diagrammatically illustrates a system for colored picture transmission; and Fig. 23 diagrammatically illustrates the application of my invention to the reproduction of sound.

In order to measure the local intensity of radiation in the spectrum, in practice a gap of a substantial width must be provided in the spectroscope because otherwise the intensity obtained would be insufficient for measuring purposes. Furthermore, the measuring devices in general use extend over a substantial range of the spectrum, although it is desirable to limit said range as much as possible in order to obtain a result which correctly represents the local intensity at a point of the spectrum rather than of a range thereof. The integration involved in the use of gaps of a substantial width and of measuring devices of substantial range results in a certain deviation of the measuring product from the theoretical correct value. F. Paschen, in Wiedemann's Annalen, Vol. 60, 1897, page 712, has called attention to the fact that a curve showing the intensity of a spectrum is distorted and that the maximum or minimum peaks, i. e., the so-called stripes of absorption, are diminished and may even completely disappear. This is, for instance, the case when the intensity is measured by a bolometer.

C. Runge, in Zeitschrift für Mathematik, 1897, page 206, has developed a method of calculation to compensate for this undesired but unavoidable integration by using a differentiation based upon Paschen's equation. This method has been extensively used by Paschen and others to correct the results of bolometric measurements of spectra. The calculation method of Paschen and Runge has for its object to find the corrected value of intensity, i. e., the value which would be obtained if a gap of infinitely small width, and a bolometer of infinitely small range, could be provided.

Their method is based upon observing by means of the usual bolometer and of a gap of a substantial width $a$; first, an intensity value $F(x)$ corresponding to a wave length $x$ and, second, the values $F(x-a)$ and $F(x+a)$ corresponding to the wave length $(x-a)$ or $(x+a)$, respectively, which are located to the right and to the left of the first measured point. In order to find the correct value $f(x)$ in the point of the wave length $x$, Runge developed the following progression:

$$a \cdot f(x) = 2\left\{\frac{Fx}{2!} - \frac{1}{4}\Delta^2 F(x) + \frac{(2!)^2}{6!}\Delta^4 F(x) - \frac{(3!)^2}{8!}\Delta^6 F(x) \ldots \right.$$
$$\left. - + (-1)^n \frac{(n!)^2}{(2n+2)!}\Delta^{2n} F(x) \ldots \right\} \quad (1)$$

The terms in this equation are intended to mean:

$$\Delta^2 F(x) = \{F(x+a) - F(x)\} - \{F(x) - F(x-a)\} \quad (2)$$

$$\Delta^4 F(x) = \{\Delta^2 F(x+a) - \Delta^2 F(x)\} - \{\Delta^2 F(x) - \Delta^2 F(x-a)\}$$

$$\Delta^{2n} F(x) = \{\Delta^{2(n-1)} F(x+a) - \Delta^{2(n-1)} F(x)\} - \{\Delta^{2(n-1)} F(x) - \Delta^{2(n-1)} F(x-a)\}$$

If the values $f(x)$ obtained by observation are measured in points spaced by the amounts $a$ from each other, this amount being equal to the width of the gap, the terms $\Delta 2 F(x)$, etc., may be calculated by way of a successive formation of differences. However, if $f(x)$ is registered in form of a continuous curve, the following form of a row is preferable:

$$af(x) = F(x) - \frac{1}{6} F_1(x) + \frac{2}{45} F_2(x) - + \ldots \quad (3)$$

wherein $$F_1(x) = \frac{F(x+a) + F(x-a)}{2} - F(x) \quad (4)$$

and $$F_2(x) = \frac{F_1(x+a) + F_1(x-a)}{2} - F_1(x) \quad (5)$$

Paschen adopted the following course in order to correct his bolometrical observations, or, in other words, to correct the curves obtained. He diagrammatically represented the intensities $F(\lambda)$ as a function of the minimum deviation $\lambda$, and on the basis of the curve obtained, he calculated the correct value $F_1(\lambda)$ for every single point. Subsequently, the values $F_1(\lambda)$ were graphically recorded and from this new curve the terms $F_2(\lambda)$ were in a similar manner calculated for all points. Finally, the terms $af(\lambda)$ were calculated by means of formula 3 on the basis of the terms $F_1(\lambda)$, $F_2(\lambda)$ were so found.

Paschen has published the results of some of these calculations and, in fact, the corrected curve representing the absorption of certain rays in a layer of carbon-dioxide of a thickness of 30 cm. indicates a degree of absorption of 100°, which is known to be correct. The measured value, however, amounted only to 90°. This demonstrates the correctness of Paschen's method, but it is obvious that for practical purposes such calculation method is too cumbersome, particularly if a great number of points must be corrected or a great number of different curves are to be analyzed in order to obtain a correct representation of absorption spectra or emission spectra.

One object of my invention is to provide a simple and practical method and means correctly to indicate the radiation intensity of spectra. The invention may be practiced by means of a spectroscope having a wide gap and which, therefore, operates with an intense radiation. Such method of recording spectra is of great industrial importance, e. g., in the manufacture of colored or other glasses adapted to absorb certain rays and transparent for other rays. The above explained method of correcting spectra, which was the only one known prior to my invention, cannot be used for these purposes, because it would involve rather complicated calculations. In the present case "width of the spectroscope gap" defines the width which the spectral line assumes in the spectrum. Whether or not this is identical with the width of the actual gap depends on the arrangement of the lenses. The invention may find further application in arts wherein it is of utility to draw conclusions from spectral diagrams to the structure of matter and to the chemical constitutions of numerous bodies such as dye stuffs. My invention creates various possibilities of achieving this object. For the sake of simplicity and clearness, in the following the letter $\lambda$ may designate the wave length, the desired corrected intensity may be designated by $E^0\lambda$, the directly measured intensity corresponding to the wave length $\lambda$ may be called $E\lambda$. The width of the spectroscope gap may correspond to that of the bolometer and may amount to $a$. The secondary intensities measured at the points in which the wave length amounts to $(\lambda-a)$ and $(\lambda+a)$ may be called $E^+\lambda$ or $E^-\lambda$, respectively, corresponding to the above mentioned terms $F(x+a)$ and $F(x-a)$. In a similar manner, $E^{++}\lambda$ and $E^{--}\lambda$ designate those intensities of radiation directly measured in the points which are spaced from the point of $\lambda$ by $2a$ to either side. They correspond, as is obvious, to the aforementioned terms $F(x+2a)$ or $F(x-2a)$, respectively.

The following considerations are based upon the fact that for nearly all practical purposes it is sufficient to know the correct ratio of the intensities corresponding to the various wave lengths.

I have found that Runge's formula, if limited to include the correction terms of the first order only, i. e., the correction terms based upon the first adjacent points $(\lambda+a)$ and $(\lambda-a)$, may be transformed to read as follows:

$$\frac{6}{7} E^0\lambda_1 = E\lambda_1 - \frac{1}{14}(E^+\lambda_1 + E^-\lambda_1) \quad (6)$$

or $$E^0\lambda_1 = \frac{7}{6}\left[E\lambda_1 - \frac{1}{14}(E^+\lambda_1 + E^-\lambda_1)\right] \quad (6a)$$

This formula relates to the wave length of $\lambda_1$. Accordingly, the formula relating to another wave length $\lambda_2$ would read:

$$\frac{6}{7} E^0\lambda_2 = E\lambda_2 - \frac{1}{14}(E^+\lambda_2 - E^-\lambda_2).$$

The above mentioned detailed formula 3 may be transformed in a similar manner, including the correcting terms of first and second order to read as follows:

$$\frac{30}{37} E^0\lambda = E\lambda - \frac{23}{222}(E^+\lambda + E^-\lambda) + \frac{1}{111}(E^{++}\lambda + E^{--}\lambda) \quad (7)$$

Formula 6 means that the desired value $E^0\lambda$ is proportional to the term obtained by subtracting, from the directly measured intensity $E\lambda$, 1/14 of the total of secondary intensities $E^+\lambda$ and $E^-\lambda$, measured in the points to the right and to the left of $\lambda$.

In an analogous manner the more precise approximate value $E^0\lambda$ calculated with two correcting figures is proportional to a term obtained by increasing the intensity, directly measured for $\lambda$, by an amount of 1/111 of the total of the secondary correcting intensities $E^{++}\lambda$ or $E^{--}\lambda$, respectively, and by subsequently subtracting from the result 23/222 of the total of the adjacent intensities $E^+\lambda$ or $E^-\lambda$. If it is desired to obtain the absolute values of the corrected intensity $E^0$ this may be accomplished by multiplying the result of the formula 6 or 7, respectively, by 7/6 or 37/30, respectively. (Compare formula 6a). A comparison of the result obtained on the basis of formulæ 6 and 7 with the result of Paschen's observations corroborates their perfect equivalence to the complicated calculating method of Runge. On the basis of the formulæ 6 and 7, in accordance with the present invention a great variety of mechanical correcting devices may be designed which are operative directly to indicate the values $E^{\circ}\lambda$ without necessitating any calculation. A simple device of this kind comprises a transparent scale similar to a harp-planimeter provided with two scales in the direction of the ordinate (e. g., in full lines and dotted lines) and provided with spaced ordinate lines, the distance between which equals the breadth or range of the bolometer, the secondary scale represented by dotted lines having a pitch which is fourteen times as large as that of the other scale (compare Fig. 1).

This device is used in the following manner: A transparent plate is placed upon the diagram in such a manner that the abscissa axes of the diagram and scale coincide. Now, the value $E\lambda$ corresponding to a certain point of the diagram is read in the full line scale and may amount, for instance, to 95. The secondary ordinate values $E^{+}\lambda$ and $E^{-}\lambda$ are read from the dotted line scale having a pitch which is fourteen times as large. In Fig. 1, $E\lambda$ is assumed to equal 95, $E^{+}\lambda$ to equal 84, $E^{-}\lambda$ to equal 70. In this case the secondary scale indicates the value $$\frac{E^{+}\lambda}{14}$$

to be 6, and $$E^{-}\lambda$$

to be 5. These values are combined in accordance with formula 6 to obtain $$\frac{6}{7}E^0 = 95 - (6+5) = 84$$

A great variety of completely mechanical calculating devices may be designed on a similar basis.

Such a device may comprise, for instance, three rules which are to be set to coincide with the three points of the spectroscope diagram and indicating the terms $E\lambda$, $E^{+}\lambda$, $E^{-}\lambda$, and which are cooperatively connected by way of appropriate gears, whereby the support of the rule set to $E\lambda$ is retracted by an amount of $1/14$ ($E^{+}\lambda$ and $E^{-}\lambda$), so that its tip, which may be provided with a recording pen, indicates the desired ordinate $E^{\circ}\lambda$. The gear mechanism may comprise appropriate levers or toothed levers or toothed gears operating upon the ends of a connecting element having its central part connected with the rule coordinated to the point $E^{\circ}$ and being acted upon by the secondary rules coordinated with $E^{+}\lambda$ and $E^{-}\lambda$. This device is manipulated by guiding the tips of the three rules along the incorrect diagram indicating the measured intensities, for which purpose the diagram may be represented by a groove or a bent ledge, produced, e. g., in a photomechanical manner. Similar devices may be devised for a calculation involving the use of several correcting figures.

Fig. 2 shows such a correcting device constructed in accordance with the present invention and comprising three rules and a recording pen controlled thereby. The device comprises a frame 1, embraced by lateral posts 2 and 3, and guided along a rail 4 parallel to the abscissa axis of the diagrams 5, 6, 7, 8 to be corrected. A carriage 9, guided between the vertical posts 2, 3, is provided at its pointed top 10 with a vertical slot indicated by transverse line 11. The imaginary intersection of line 11 with the central line of the slot is guided to coincide with the diagrams 5, 6, 7, 8, indicating the measured intensity $E\lambda$. On the carriage 9, two lateral rules 12 and 13 are guided between the flanges 14 and 15 to move parallel to the posts 2 and 3. These rules are provided with upper tips to the right and at the left of the pointed top 10. These tips are guided along the curve in the same manner as the top 10. These lateral tips indicate the secondary values $E^{+}\lambda$ and $E^{-}\lambda$, while the top 10 indicates the primary value $E\lambda$. Each rule 12 or 13, respectively, carries a gear 16 and 17 engaging lateral racks 18 and 19, respectively, attached to the posts 2 and 3. Owing to this arrangement the gears 18 and 19 revolve when the rules 8 and 12 are displaced. Attached to the gears 18 and 19 are spiral shaped cams 20 and 21 actuating a lever 22 held in engagement with the cams through action of a spring 23. The lever 22 is connected at its center 24 with a rack 26 by means of a connecting rod 25. Adjacent to the rack 26 a second rack 29 is arranged, carrying at its top a recording pen 30. The racks 26 and 29 are interconnected through gears 27 and 28 in such a manner that any movement of rack 29 be in a ratio of 7/6 to the movement of the rack 26. The shape of the cams and the cutting of the gears is such that the highest peaks of the diagram may be reached by the tips of the lateral rules without rotating the coordinated cams through more than 180°. Furthermore, the cams 20 and 21 are so designed that they lift the ends of lever 22 by 1 mm., when the pinions 16 and 17 are lowered by 7 mm. rolling down the racks 18 and 19.

The operation of the device is as follows:

The carriage 9 and the rules 12 and 13 are so adjusted that their three points, i. e., the points of the tips 12 and 13 and the aforementioned imaginary point on line 11 register with the curve.

The recording pen, owing to its interconnection with the carriage 9 and the two rules 12 and 13, will be automatically adjusted to the corrected value. If the three points are guided along the curve representing the measured values, it follows that the recording pen draws a curve representing the correct value.

As the three points represent the points $E\lambda$, $E^{+}\lambda$, and $E^{-}\lambda$, their distance must correspond with the width of the gap and the breadth of the bolometer strip. The elevation of the recording pen 30 measured from the abscissa axis of the diagram equals $$\frac{7}{6}\left[\left(E\lambda - \frac{1}{14}\right)\cdot(E^{+} + E^{-})\right],$$

as will appear from the following consideration:

When the indicating points of the three sliding members 9, 12 and 13 are set to coincide with the curve 5, 6, 7, 8 and are shifted for this purpose from their original position by the amounts of $E\lambda$, $E^{+}\lambda$, and $E^{-}\lambda$, respectively, the recording pen 30 is subjected to a movement which depends upon the movement of carriage 9 and on the displacement of the rules 12 and 13 relative thereto.

It may be assumed that in adjusting the three points, first only the member 9 may be moved bodily together with the rules 12 and 13, until its imaginary point on line 11 is raised by the amount of $E\lambda$ to register with the curve. As a consequence, pen 30 is raised by the same amount $E\lambda$, i. e., by the first term included in the parenthesis of the formula. Now, the lateral rules 12 and 13 are adjusted to register with the curve. As a consequence, gears 18 and 19 are rolled along the coordinated racks, and the cams 20 and 21, connected with the gears, are turned, whereby the ends of lever 22 are lowered relatively to slide 9. Hence, the center 24 of the lever is lowered by an amount proportional to the elevation of the lateral points of rules 12 and 13, measured from the abscissa axis, i. e., proportional to the amount $E^+\lambda$ or $E^-\lambda$, respectively.

The construction of the gears and cams is such that the ratio of proportion P equals 1/7. Hence it is apparent that the point 24 is not raised by the same amount $E\lambda$ as is the carriage 9, because its elevation is corrected by a simultaneous relative subtraction performed by the action of the cams, which subtraction amounts to $1/7.\tfrac{1}{2}(E^+\lambda+E^-\lambda)$ or $1/14\,(E^+\lambda+E^-\lambda)$. This term represents the second term included in the parenthesis of formula 6a. Owing to the cooperation of the various parts of the device the center 24 of the lever is subjected to an upward movement amounting to what is included in the parenthesis in formula 6a. If the pen 30 were directly connected with point 24, the multiplication with 7/6 provided for in formula 6a, would be missing. The requirement of this multiplication is complied with by the provision of the gears 27 and 28, forming the operative connection between point 24 and the recording pen 30. Owing to these gears pen 30 is raised by an amount equaling 7/6 of the elevation of point 24. Hence, the elevation of pen 30 automatically represents the correct value $E^\circ\lambda$ as defined in formula 6a. All the operator has to do is to guide the three points of the members 9, 12 and 13 along the diagram, representing the result of the spectroscopic observation. The diagram representing the corrected value will automatically be drawn by the pen 30.

The corrected diagram may be obtained in a simpler and even more precise manner by providing in the measuring device means operative to form the corrected amount which indicates the radiant intensity in the course of the observation, by automatically combining figures such as and in the manner set forth in the formula. Some embodiments constructed along these lines will be briefly described.

It is to be understood that my invention is in no way limited to these embodiments which serve merely to illustrate it. Numerous other embodiments may be readily designed by anyone skilled in the art.

If, in a spectral measuring apparatus, the responsive device measuring the radiant intensity consists of a thermo-element or a similar radiometrical device, the indication of which is proportional to the intensity to be measured, three measuring devices may be combined directly to indicate the corrected amount in the manner illustrated in Figs. 2a and 3.

Fig. 2a is a perspective view of a spectral measuring apparatus, comprising a source of light 92, a lens 93, and a collimator slot or gap 91 upon which parallel rays are projected through said lens. The rays which pass gap 91 are cast upon a prism 95, wherefrom the light issues in the form of a spectral beam which is projected through a suitable lens 96 upon a plate 100, to form a spectrum 97 thereon. (See Fig. 3.) The lens 96 is mounted in the front wall of a box 98 provided with a cover 99 which is illustrated in open position. The plate 100 is shiftably mounted upon the rear wall of the box in the manner shown in Fig. 3, and may be moved by means of a threaded spindle 111. In order to eliminate lost motion between the spindle and its guiding nut, the plate 100 is subjected to the pressure of a spring 112, extended between a suitable point of the rear wall and plate 100. The spindle is provided with a calibrated knob 113, the scale of which indicates the wave length of the light cast upon a measuring device provided on plate 100. Between lens 93 and the gap 91 there is provided a receptacle 114 having transparent walls and adapted to hold the medium to be examined. If the medium is of the kind which absorbs light of certain wave lengths, black stripes will appear in the spectrum, such as indicated in Fig. 3. The measuring device mounted on plate 100 comprises three thermo-elements constituted by three parallel tapes 31, 32, 33, each composed in the well-known manner of two different materials, so that an electric tension is generated by heating the point at which the different materials touch each other. These points are situated along the center line of the spectrum. The free ends of the three tapes are connected by electric conductors in such a manner that the tension generated in the central tape 31 is counteracted by the tension produced in the lateral tapes 32 and 33. In the embodiment shown the three elements are connected in series, the lower ends of the tapes 31 and 32 being connected with each other, and the upper ends of the tapes 31 and 33 being in connection with each other. The upper end of tape 32 and the lower end of tape 33 form the terminals, the voltage of which gives the desired indication of the tension produced in the central tape and reduced by the tensions generated in the two lateral tapes. The breadth of each tape equals the width of gap 91 and may be dimensioned in accordance with the requirements which depend on the one hand on the dispersion and the size of the apparatus; or, in other words, on the length of the spectrum; and on the other hand, on the exactness of the desired result. I have found that satisfactory results may be obtained by thermo-element tapes having an angular size of seven arc minutes relative to the prism.

The central element 31 is so positioned that the scale on the knob 113 accurately indicates the wave length of the light cast upon the longitudinal central line of the element 31.

This element 31 constitutes the main element, and the electric tension produced therein is proportional to the amount $E\lambda$, i. e., proportional to the energy of radiation prevailing in the range of the spectrum covered by the tape 31. The auxiliary elements 32 and 33 arranged to the right and to the left of element 31 indicate the amounts of the adjacent energies $E\lambda$, $E^+\lambda$, or $E^-\lambda$, respectively. The breadth of the tapes 32 and 33 equals that of the main element 31, but their specific thermo-electric power amounts to but 1/14 of that of the main element 31. As above mentioned, the three elements are interconnected in such a manner that the voltage between the terminals equals the tension generated in tape 31 reduced by the total of the energies produced in tapes 32 and 33. Hence, it is obvious that the cooperation of the three elements corresponds with the cooperation of the various figures in formula 6a, and the resulting voltage, which is indicated by a suitable galvanometer 115, gives an indication of the corrected intensity $E^\circ\lambda$ which corresponds to the intensity which would be measured along the central line of element 31 if an infinitely narrow gap 91 were employed. As plate 100 may be adjusted by means of the knob 113 to locate its measuring elements at any desired point of the spectrum 97, the accurate intensity of the latter may be easily determined without requiring any calculation or transposition of curves.

It has been mentioned that the three tapes a similar manner, further ranges of the spectrum of third order may be provided with bolometers providing for a consideration of the energies $E^{++}\lambda$ and $E^{--}\lambda$.

Various ways are available for securing the desired ratio in effect of the primary elements and the secondary elements. In case of composite thermo-elements the material may be selected in the manner described in order to obtain the ratio of 1/14, 23/222 or 1/111, respectively. It is to be understood, however, that the desired ratio depends on the testing conditions and on numerous details of the apparatus and that on account of these circumstances other ratios may be found preferable. In case of bolometers of the kind shown in Fig. 7 and Fig. 8, the electric tension impressed upon the elements may be varied and the material used may be selected to suit the particular requirements. Furthermore, the surfaces of the measuring elements exposed to radiation may be so dimensioned as to give the desired ratio of the individual effects, or an intermittent radiation may be used in which the radiation of certain elements is intermittently interrupted for certain periods selected in accordance with the requirements in the particular case. Another condition to be taken into consideration consists in the cooling properties of the elements.

Instead of combining the individual effects in the measuring device they may be combined in the indicator itself. For this purpose a galvanometer may be used having several individual windings counteracting each other and fed by the current delivered by the individual measuring elements.

The aforesaid principle of timing the radiation of the individual measuring elements by way of an intermittent radiation may be carried into effect by an apparatus having but one measuring element which is movably arranged. This element is alternately kept in the position $E\lambda$ and automatically intermittently moved into the positions of $E^+\lambda$ and $E^-\lambda$. The electric connection with the indicator is provided with a switch permitting the current to be reversed as desired, and this reversal is performed whenever the element is moved from its primary position into one of its secondary positions. The indicating instrument is constructed in such a manner as to respond very slowly to the changes in the electric current supplied, so that it indicates the average amount $E°\lambda$ composed in the sense of formula 6a. If a photoelectric measuring element is used which responds quickly to changes in radiation, then the following arrangement may be provided: The electric current produced is switched by suitable means to pass through the indicator, e. g., galvanometer, in alternate directions, so that the relatively sluggish galvanometer indicates only the average. In synchronism with the change of the electric connections the spectrum is shifted relatively to the photoelectric element in the manner heretofore explained. As a consequence, the secondary energies $E^+\lambda$ and $E^-\lambda$ are subtracted from the primary energy, the ratio depending upon the periods for which the photoelectric element is exposed to the radiation. I have found that satisfactory results may be obtained by exposing the element in its central primary position for $\frac{1}{10}$ second, and its secondary positions for 1/140 second, in accordance with the formula 6a.

The reciprocatory movement of the spectrum may be accomplished in various ways, for instance, by oscillating the gap 91 (Fig. 2a), or by providing three such gaps which are alternately opened and closed.

In Figs. 9 and 10 I have shown an arrangement permitting the spectrum to be intermittently shifted in such a manner that the primary energy and the secondary energies are alternately projected upon the measuring element which is connected with a galvanometer through the intermediary of a suitable switch. Fig. 9 is a perspective view of an apparatus similar to that shown in Fig. 2a. It differs from the latter in that there is provided only one measuring tape 116 and that a conical drum 117 is inserted behind the gap 91. This drum is rotatably supported on an inclined shaft 119 coupled with a suitable electric motor. On the mantel of the drum there are provided a plurality of double prisms 118, adapted to refract the beam of light. These prisms are composed of two different kinds of glass in a well-known manner, in order to refract the light without dispersing its colored components. The space between adjacent prisms is left free, so that the beam may pass therethrough.

In Fig. 10, the drum 117 with the gap 91 in front thereof, the lens 94, the prism 95 and the collecting lens 93 are shown on an enlarged scale. As will clearly appear from the drawings, owing to the inclined position of the shaft 119, the beam may freely pass over the rear rim of the drum. When the drum is rotated by its electromotor, the beam is alternately diverted to the right or to the left and it remains undiverted between the passage of successive prisms 118. The prisms and the distance between them are so dimensioned that the element 116 is exposed in the desired manner. If the desired ratio between the exposures to the primary radiant energy and to the secondary radiant energies amounts to 1/14 in accordance with formula 6a, the circumferential breadth of the entire prism 118 is 1/7 of the circumferential distance between two successive prisms. As a consequence, the effect performed by the beam, while the same freely passes through the space between two successive prisms, amounts to $E\lambda$, and the effect of the beam, while the same is diverted either to the right or to the left, amounts to 1/14 $E^+\lambda$ or 1/14 $E^-\lambda$, respectively. The distance between the gap 91 and the opposite front of the drum 117 is preferably rendered as small as possible so as to avoid distortions of the spectrum. Furthermore, the bearings of shaft 119, not shown in the drawings, are shiftably arranged parallel to the direction of the beam with a view to rendering said distance adjustable. Such adjustability permits the convenient variation of the amount of the reciprocation of the spectrum in accordance with the width of the gap and the breadth of the measuring element. The length of the reciprocatory movement of the spectrum depends, of course, on the distance of the prism 118 in its refracting position from the plate upon which the spectrum is projected. Hence, this length is varied by shifting the drum 117 in the direction of the beam. The actual amount of the reciprocation may easily be measured by projecting a monochromatic light, for instance yellow light, upon plate 100, upon which a single yellow line will appear, the stroke of which may easily be perceived and measured. In order to subtract the secondary energies in the desired proportion from the primary energy, a switch is inserted between the measuring element and its indicator 115. In the embodiment shown, the switch is cooperatively may be composed of different materials in order to obtain the desired different thermo-electric forces. I have found that satisfactory results may be obtained by forming the upper portion of tape 32 of nickel iron alloy containing 2.2 per cent. nickel, the lower portion of gold, the lower portion of element 31 connected therewith of bismuth, the upper portion of element 31 of silver, the upper portion of the adjacent element 33 connected therewith of nickel iron alloy containing 2.2 per cent. nickel, and the lower portion of element 33 of gold. The main element 31 composed of bismuth and silver has thermo-electric properties which are about 14 times that of the auxiliary elements 32 and 33. Element 31 generates 72 microvolts per degree of temperature, while the auxiliary elements produce 5 microvolts per degree only.

Fig. 4 illustrates a different embodiment of the thermo-electric elements which may be substituted for the elements shown in Fig. 3. In this case the three elements form one tape composed of four portions of different materials and arranged in longitudinal relation to the spectrum in such a manner that the three joints 34, 35 and 36 of its four portions are spaced from each other by equal amounts and are of the same size as the gap 91. This arrangement is particularly adapted for micro-radiometers in which a single thermo-electric coil is suspended within a magnetic field to serve as the coil of a galvanometer, while the spectrum is either vertically arranged or is rotatable by optical means in a manner well known in the art.

In a similar manner the teaching represented by formula 7 may be realized by arranging additional thermo-electric elements of a third order, one on each side of the group of elements 31, 32 and 33. In this case, the elements 32 and 33 of the second order are composed of materials producing 23/222 of the tension generated in the central main element. The additional elements of third order are so connected with the other elements as to increase the tension of the main element by $1/111 \, (E^{++}\lambda + E^{--}\lambda)$. Compare formula 7. In Fig. 5 this arrangement is diagrammatically illustrated. s designates the spectrum. The elements 31', 32' and 33' are constituted by composite thermo-electric tapes such as shown in Fig. 3. The additional tapes 34' and 35' of a third order are connected in series with the other elements in such a manner that their tension acts in the same direction as that produced in the element 31'.

It is obvious that further pairs of elements of third, fourth, etc., order may be added.

If it is desired to obtain the absolute amounts of the radiant intensity the instrument indicating the voltage of the thermo-elements may be adjusted directly to indicate the desired values. In this case calculations of any kind may be dispensed with and the tests may be accomplished in an extremely simple and accurate manner. The advantages achieved by my invention are particularly conspicuous if the result of the tests is automatically registered by means of an instrument registering in a well-known manner the voltage of the measuring elements in form of a diagram.

While in the present embodiment thermo-elements are contemplated as measuring elements, it is obvious that any suitable instrument may be used to measure the radiant intensity, for instance, radiometers, micro-radiometers, differential thermometers, bi-metal apparatus bolometers, ionization chambers for X-rays, radioactive rays, etc. In case of bolometrical measuring devices the operation of which is based upon a change in the electric resistance, the subtractive or accumulative effect upon the terms $E+\lambda$, $E-\lambda$, $E^{++}\lambda$, $E^{--}\lambda$, etc., in the sense of formula 6a, may be accomplished by use of the well known Wheatstone bridge connection which is customary for bolometers. In Fig. 6 the resistance elements 37, 38, 39 and 40 represent bolometer elements sensitive to changes in temperature. 42 is the indicator and 43 is a voltage source. The radiant effects upon the opposite members or branches 37 and 40 operate upon the indicator in the same sense, while similar effects upon the branches 38 and 39 counteract said effect. In this manner the indicator reading represents the effects exerted upon members 37 and 40, reduced by the effects upon members 38 and 39. Obviously, the members 37 and 40 may be arranged to represent the main element in point $\lambda$, while the branches 38 and 39 form the adjacent auxiliary or secondary elements in the points $\lambda+a$ and $\lambda-a$. Another way of combining the effects represented by the coordinated terms in formula 6a would be to divide one of the branches in two portions connected in shunt with each other and forming the auxiliary elements arranged to the right and to the left of the main central element. Furthermore, correcting terms of a third order may be provided for by adding further branches in the manner of the so-called double bridge.

An arrangement which is even simpler than the ones heretofore described may be obtained by forming the two elements constituting the coordinated terms of the formula, such as the terms $E+\lambda$ and $E-\lambda$, as an integral structure in which the accumulation of the individual effects is automatically accomplished by means of thermic or electric compensation.

An embodiment of such an arrangement is diagrammatically shown in Figs. 7 and 8. The dotted line s—s in Fig. 7 represents the longitudinal section through the plane of the spectrum which, accordingly, is positioned vertically to the plane of the drawings. The rays are cast in the direction of the three arrows which indicate the points in which the energies $E+\lambda$, $E-\lambda$ and $E-\lambda$ are to be measured. Screens 44 and 45 and a bolometer tape 46 arranged therebetween and blackened at its front confine three adjacent portions of the spectrum. The primary, central portion $E\lambda$ is projected upon the bolometer tape 46, while the secondary lateral portions pass through the gaps on both sides of the tape 46 and fall upon a broad bolometer tape 47. The electric connection between the two tapes 46 and 47 is shown in Fig. 8. The indicator is shown at the left, and at the right a Wheatstone-bridge is represented. Owing to the radiation the electric resistance of tape 46 is increased by a certain amount. In a similar manner, the resistance of the member 47 is increased, by an amount, however, which is substantially smaller because the radiation is distributed over a larger area. The distance between the members 46 and 47 is dimensioned with a view to obtaining the desired ratio in accordance with formula 6a. This ratio amounts to 1/14 in case the gaps between the screens 44 and 45 and the tape 46 equal the width of tape 46. Owing to the bridge connection shown in Fig. 8, the effect of the radiation on the member 47 counteracts the effect produced in the member 46 in the sense of formula 6a, so that the indicating instrument gives the corrected result. In connected with the shaft 119 and is actuated in synchronism with the intermittent action of the prisms 118 whenever a prism is moved through the beam, and during the period of the movement the connection with the indicator 115 is reversed. Instead of reversing the connection, one of two batteries or other sources of current may be alternately connected with the instrument, the two batteries being connected in opposition to each other.

Instead of causing the spectrum to reciprocate relatively to the measuring element, both may remain stationary, and a reciprocating screen provided with a gap may be interposed between them. In this case, the measuring element is exposed to that part of the spectrum which passes through the reciprocating gap, and this gap is moved in such a manner that alternately the main energies and the secondary energies are active upon the measuring element. In this case, the electric connection is reversed in synchronism with the reciprocation in the same manner as heretofore described in connection with Figs. 9 and 10.

While in the embodiment heretofore described, the combination of the primary energies with the secondary energies is performed either in the measuring device or in the indicator, it is to be understood that many other forms may be adopted without departing from the spirit of my invention. The combination may, for instance, be effected by devices such as amplifiers, interposed between the measuring element and the indicator. In measuring elements the operation of which is based on the reduction of the electric resistance as a consequence of radiation, such as selenium cells, or in measuring elements controlling the passage of an electric current in a similar manner, such as photoelectric cells or condensation chambers for X-ray spectroscopy, the subtracting of the amounts to be combined in accordance with Formula 6a may also be performed in the following manner: A part of the current controlled by the primary measuring element and delivered to a galvanometer or to a similar indicator is branched under the control of the secondary measuring elements. The latter are operated with a different voltage or they are filled with a different material to insure the desired ratio in the effect of the primary energy and the secondary energies to be combined.

Instead of measuring the primary and the secondary energies by means of separate electric cells, a more compact structure may be obtained if a unitary measuring element is used with several sensitive electrodes which may be directly combined with amplifiers.

A very simple way of subtracting the effects of radiation upon the primary and the secondary measuring elements is afforded by utilizing a primary element in which the radiation reduces the electric resistance, and a secondary element in which the electric resistance is increased by radiation (bolometers). These elements are simply connected in series.

Under certain conditions it may be desirable to reduce the undesired influence of fluctuations in the energy of the source of radiation. For this purpose, a separate compensating measuring device may be combined with the measuring devices heretofore described, such compensating devices, for instance, as have been used by P. P. Koch in his micro-photometer or by me in spectral photometers of the recording type.

The present invention is particularly applicable to the art of visual spectral photometry, since it makes possible the use of wide gaps and bright radiation which may be easily controlled visually, particularly in the ranges of wave lengths to which the human eye is relatively unsensitive. Prior to my invention, the use of wide gaps involved an undesirable obliteration of the spectral graduation of the intensity. One object of my invention is to avoid these disadvantages, thereby providing the possibility of obtaining exact results in spite of the use of a wide gap. In case the photometric method consists in comparing two ranges of different spectra of equal or similar color, both ranges appearing in the visual field, my invention may be carried into effect by adding the secondary radiations associated with the particular range of the one spectrum subject to examination, to the other range to be compared therewith, and, vice versa, by adding the radiations, secondary to the last mentioned range, to the first mentioned range. The fact that such a crosswise additive coordination of the primary and the secondary radiations corresponds with Formula 6a, will be apparent from the following expression of the condition of identity $E_1° = E_2°$ in the terms of Formula 6a:

$$\frac{7}{6}\left[E_1 - \frac{1}{14}(E_1^+ + E_1^-)\right] = \frac{7}{6}\left[E_2 - \frac{1}{14}(E_2^+ + E_2^-)\right]$$

This equation may be transformed to read:

$$E_1 + \frac{1}{14}E_2^+ + \frac{1}{14}E_2^- = E_2 + \frac{1}{14}E_1^+ + \frac{1}{14}E_1^-$$

This equation represents the mathematical definition of the above explained crosswise addition of the secondary radiations of the one range to the primary radiation of the other range, both ranges representing the lights to be compared.

The crosswise addition of the secondary correcting terms of Formula 6a may be used generally for photometric methods with indicators, and in many other fields to which the principle of the invention may be applied.

In Fig. 11 I have diagrammatically shown in a plan view a photometer for the visual comparison of spectra. This photometer is based upon the application of Formula 6a, involving the crosswise addition of the secondary radiations to the spectral ranges to be compared. These spectral ranges are each delivered by a spectroscope similar to that shown in Fig. 2a. As such instruments are available on the market and may be obtained for instance from Schmidt & Hansch, Berlin, or from Hilger, London, a detailed description is not deemed necessary. The two spectroscopes 63 and 64 are symmetrically positioned relative to a line running through 68. Each apparatus is provided with a source of light 65 or 66, respectively, or preferably a single source of light such as indicated at 67 may be used for both apparatus. This arrangement offers the advantage that fluctuations in the radiation delivered by the source of light does not effect the desired result. This is particularly important in testing and comparing the light absorbing properties of different materials which are placed in the path of the beam in the manner indicated at 114 in Fig. 2a, for instance, near the points 65 and 66. The path of the beam of apparatus 63 is indicated by full lines, and that of the other apparatus 64 by dotted lines.

The ranges of spectra to be compared are projected upon a longitudinally shiftable screen 68, having a subdivided field 69, 70 and 71, which is so dimensioned that it is capable of receiving the projection of the primary ranges and the secondary ranges of the particular portion of the spectrum to be tested. In Fig. 12 I have shown the screen 68 in perspective view. The central portion 70 is so dimensioned as to receive the primary radiation and it is open to permit the rays to pass freely into the field of the other apparatus. The lateral portions 69 and 71 are so dimensioned as to receive the secondary radiations $E^{+\lambda}$ and $E^{-\lambda}$ and have surfaces impervious to the rays and partly reflecting the same. These surfaces may consist of thin quartz plates enclosing a layer of suitable absorbing material, or they may be black plates slightly lined with reflecting material. At any rate, these reflecting surfaces absorb the major portion of the light so as to reflect but 1/14 of the impinging light, regardless of the wave length of the light. In Fig. 14, the reflected part of the light is indicated by thin lines. It follows that the primary radiation freely passing through the gap 70 is increased by the reflected portions of the secondary radiations in the manner heretofore explained. The rays thus mixed are projected upon reflectors 72 and 73 in the customary manner to permit a comparison of their intensities. This comparison is accomplished by means of a so-called Lummer-Brodhun cube 75 which is positioned at a distance between the reflectors 72 and 73. As the fraction of these devices is well known in the art of photometry, a detailed description of the reflectors 72 and 73 and of the cube 75 and their cooperation need not be given herein. It may be mentioned, however, that photometers suitable for the present purpose may be obtained from the firm Schmidt & Hänsch, Berlin.

Another field to which my invention may be applied to good advantage is the photographic registration of spectra. Prior to my invention, it was necessary either to use long time exposures or wide gaps which involve the disadvantage of obliterated spectra. My invention makes possible the obtaining of correct photographic records of spectra after substantially shortened exposure, because intense radiation may be employed. The principle of Formula 6a may be applied to photographic recording by automatically reducing at each point of the spectrum over the whole range thereof the black layer by an amount corresponding to a fraction of the sum of the secondary intensities.

As the intensities of radiation are not proportional to the density of the black layer produced thereby on the photographic plate, the coefficient of proportionality is different from 1/14 and may be selected in accordance with the conditions prevailing. The desired automatic correction may be performed by photographically recording the spectrum and by testing the photographic record by means of a photometer. In this case the records must not only be measured at one point at a time as does Koch and Moll, but must be measured at the same time at as many adjacent points as correcting terms of the second, third, etc. degree will be taken into account. The amounts measured at the points of second, third, etc. order will be combined with the amount measured at the primary point as heretofore described. The rays effective in the photometric method may be projected upon and through the photographic record plate from different sides. Furthermore, the rays may be produced by different sources of light, or by suitable screens adapted to divide separate beams from the same source of light by means of diversion, polarization, interference, differences in the wave length, etc. Suitable means are preferably provided for controlling the intensity of the beams.

Certain difficulties are involved in the use of registering photometers for measuring for the purpose of my invention the negative picture of the spectrum because commercial photometers as manufactured by P. P. Koch, Moll, Zeise, Grunsen and others measure the amount of light passing through the negative spectrum and because this amount is approximately in reversed proportion to the intensities of the original spectrum. These difficulties may be avoided by the use of a positive photographic picture of the spectrum, or by measuring the light passing through the negative pictures by means of such elements in which a radiation prompts a material decrease in electric resistance, as is the case with photoelectric cells, selenium cells or Case's thalofide cells or thermionic bolometers.

The method of first recording the spectrum in the form of a photographic picture, and then measuring the record by way of photometry affords the possibility of performing my invention in another simple and accurate manner. The picture of the spectrum may be transformed into or developed as a positive picture, serving to represent the primary amounts of radiation $E\lambda$. In addition to this picture, two other negative pictures are taken differing from the primary picture in that they are produced in a fraction of the exposure of the primary picture. These additional pictures, the secondary pictures, are superimposed upon the primary picture in such a manner that the points $\lambda$ of the primary spectrum register with the coordinated points $\lambda+a$ and $\lambda-a$ of the secondary pictures, or in other words, the secondary pictures are so placed upon the primary pictures that corresponding points in the respective spectra are spaced by the amount of $a$. The transparency left in the composite picture formed by the three superimposed plates approximately represents the spectrum corrected in accordance with Formula 6a, for the range over its entire length. As this corrected spectrum is permanently recorded in the form of a black-white graduation, it may be easily measured in a suitable photometer.

The principle upon which this combination of three pictures is based will appear from the following consideration: The transparency of the positive primary picture which is proportional to the energy $E\lambda$ of radiation, is at each point reduced by the superimposed negative pictures. This reduction in transparency amounts at each point to a degree proportional to a fraction of the accumulated secondary energies $E^{+\lambda}$ and $E^{-\lambda}$. The greater the secondary intensities $E^+$ and $E^-$ are, the less transparent are the superimposed secondary negative pictures and the greater is the reduction in transparency of the composite picture. In order to obtain the desired value of said fraction, the negative pictures must be manufactured either with a comparatively short exposure or by means of an appropriate chemical treatment in the course of their development.

The component negative spectra may be produced either simultaneously or in alternation with the positive primary spectrum, and may be directly combined therewith in order to obtain the correct composite effect. The necessary relative displacement may be accomplished by well known optical means.

Another solution of the problem of producing the subtracting effect of the secondary records upon the primary records resides in producing the primary record $E\lambda$ and the accumulated secondary records $1/14$ $(E^{+\lambda}+E^{-\lambda})$ as separate negative or positive pictures which are parallel and displaced relative to each other by the required degree. In Fig. 14 I have diagrammatically illustrated these two pictures. In Fig. 13 I have shown a similar arrangement in which the two secondary pictures are not yet accumulated but printed at different places above and below the primary picture $E\lambda$. This figure indicates the amount by which the pictures are laterally displaced with respect to each other. In order to derive the desired corrected amount of radiation from the records illustrated in Figs. 13 and 14, the transparency in the registering points of the pictures must be measured by a suitable photometer and added in the sense of Formula $6a$.

If it is desired to obtain a record of the corrected amounts of the spectral radiation in the form of a curve, this may be accomplished by subjecting the records like the ones shown in Figs. 13 and 14 to the photometric test in a registering photometer in such a manner that a main receiver is measuring the primary picture and an auxiliary receiver is simultaneously measuring the secondary picture, both measuring results being combined and transmitted to the registering instrument. It is obvious that pictures of the third order may be taken representing the correcting terms of third order given in Formula 7 and may be combined with the other pictures.

A simple multiple slot arrangement furnishing directly the desired parallel spectra in the manner shown in Fig. 14, is diagrammatically shown in Fig. 16 for a correction in accordance with Formula $6a$, and a similar arrangement is shown in Fig. 15 for a correction in the sense of Formula 7. The single vertical stripe constituting the lower part of Fig. 16 illustrates a gap or slot such as the slot 91 in Fig. $2a$, furnishing a spectrum such as the spectrum $E\lambda$ illustrated in Fig. 14. The upper part of Fig. 16 shows two slots spaced from each other by an amount equal to the width of the single slot. These two slots furnish a spectrum such as the spectrum $1/14$ $(E^{+\lambda}+E^{-\lambda})$ illustrated in Fig. 14. The slots shown in Fig. 15 must cooperate on the basis of Formula 7.

Instead of reducing the secondary intensities to the desired fraction in the step of recording the same (which may be accomplished by interposed absorbing screens or by suitably timing the exposure), the ratio of the primary or the secondary effects may be secured in the course of the photometric test of the recorded spectra. As a further possibility of applying my invention to methods of photometry, it may be mentioned that the correcting terms may be coordinated to each other in a crosswise manner as heretofore explained in connection with the visual photometry. Furthermore, the correcting formula may be transformed to contain additive terms only instead of negative terms which must be subtracted. This may be done on the basis of the well-known equation $$(1-e)=\frac{1}{1+e}.$$

The advantage offered by the heretofore described correction of spectra by first recording the same photographically and then correcting the record so obtained in preference to the direct measuring by suitably combined measuring elements adapted to analyze the original spectrum, resides in the highly important possibility of using both extended exposure and a relatively wide slot, whereby radiations may be accurately tested which are of extremely small intensity.

All the embodiments heretofore described are primarily intended to carry into effect the Formulæ $6a$ and 7 which are based upon the condition that the width of the gap or slot equals the breadth of the measuring elements. The principle discovered by me of carrying out the differentiation of integration effects in the experimental way rather than by calculating point by point, may be applied also under different conditions; for instance, if the slot is of a different width than the measuring elements.

My invention resides in the method of compensating for the undesired effects produced by the finite resolution in the analyzing process by varying the translated response from one elemental unit of energy in accordance with that derived from energies of the second or third order, is in no way limited to spatially successive energy constituted by a spectrum, but may be applied to successive energy forms of any kind, no matter whether the energy is spacially or temporarily distributed. To facilitate the comprehension of my inventive idea, the following embodiments deal with an analysis and translation of optical energy, or, in other words, radiant energy into other energy forms.

An important application of my invention has to do with the transmission of images, e. g., television. Such transmission is usually effected by scanning the picture to be transmitted point by point or line by line. This scanning may be performed by a ray controlling a photoelectric element in accordance with the transparency or reflecting properties of the particular point scanned. In the photoelectric element or elements an electric current is caused to flow dependent upon the characteristic of the light at the corresponding portion of the image. The current is transmitted to the receiving apparatus and is transformed into optical fluctuations which are composed into an integral image by means of a suitable apparatus running synchronously with the sending apparatus. The primary difficulty encountered in these methods resides in the necessity of making the individual portions or units of the image relatively large so as to obtain the desired speed in transmission by means of a single scanning ray in the sending apparatus. However, if these portions are too large, the details of the image are obliterated in the transmission. If they are too small, the electric energy available for the transmission is too small and an excessive time is required for scanning an image of a certain size.

My invention is based upon the consideration that the requirements for scanning a line or stripe-shaped portion of the image are essentially the same as for the spectral analysis, since in this case also it is desirable to obtain as undistorted a transmission as possible in order to record the details of the graduation in intensity of radiation. The reduction in the width of the slot of a spectroscopic apparatus with a view to securing a correct analysis of the details of graduation has the same disadvantages as the reduction in the size of the image element. In both cases the intensity of radiation is reduced.

In this case also the principle of my invention resides in compensating for the undesired effects produced by the finite resolution in the analyzing or scanning process by affecting the translated response from one elemental unit in accordance with the response derived from adjacent units. In other words, the transmission of the primary energies is effected by the secondary adjacent energies by means of suitable sending or receiving apparatus or both. Better to illustrate the advantages of my invention when applied to picture transmission and the like it may be assumed that the image to be transmitted be the record of a spectrum such as the spectrum $E\lambda$ in Fig. 13. In the sending apparatus this image is scanned by suitable means responsive to the differences in the characteristics of the light reflected by the successive units of the image. Such means may comprise, e. g., a photoelectric cell or even a thermo-element. In this case the successive units of the spectrum are successively scanned and the resulting current impulses are transmitted to the receiving apparatus wherein, by suitable optical means, they are successively composed into an equivalent image. If the scanning ray or the equivalent scanning device is made of the same width as the slot which has furnished the spectrum, e. g., .1 mm., the intensity available is relatively small and, as a consequence, the transmission cannot be performed but very slowly. If the width of the scanning ray and the corresponding width of the spectroscopic slot is doubled, the intensity is increased in proportion to the square, i. e., to four times that of the previous intensity, whereby the speed of transmission may be accordingly increased. However, the details in the graduation of the spectrum are obliterated on account of the wide scanning ray and the wide spectroscopic slot. It follows that prior methods involve the serious disadvantage that the speed in transmission is paid for by the loss of the details of the image so that in the receiving apparatus the graduation of the spectrum is recorded as a blurred or entirely obliterated graduation.

One object of my invention is to make possible the use of a wide scanning ray or, generally speaking, of a broad scanning range without the disadvantage of losing the details of the image. This object is attained by correcting the translated response from one elemental unit by means of the adjacent elemental units. This correction may be performed in various manners:

(a) It may be performed in the sending apparatus by correcting the graduation blurred or obliterated on account of the broad scanning range, e. g., through the intermediary of secondary scanning ranges functioning in a similar manner as did the secondary thermo-elements in Figs. 2a and 3. The succession of the electric impulses so corrected and increased may be transmitted to the receiving apparatus in the ordinary manner.

(b) In the sending apparatus a broad scanning range is used for increasing the energy and the succession obliterated on account of the broad scanning range is transmitted to the receiving apparatus and, then, corrected and refined by subjecting each elemental unit to the influence of the adjacent units.

The second way outlined under (b) offers the advantage that the transmission and amplification of the electric impulses may be performed in a relatively simple manner because they do not include subtle fluctuations in the intensity. Only those fluctuations are necessary which, if recorded in the form of a curve, would be represented by steep peaks and valleys. Owing to the absence of subtle variations in energy, the transmission may be performed by means of wireless apparatus involving the use of high frequency restricted to a narrow band.

The principle of refining the graduation can be applied to converting spatially successive energies into temporarily successive energies and vice-versa, but only if the condition is complied with that adjacent energy units overlap each other in the same manner as in an obliterated spectrum. This condition exists at a sending station where the images are scanned because even a highly concentrated scanning ray covers a certain area of the image which will never be equal to an ideal unit of uniform light characteristics but, as a rule, comprises heterogeneous distribution of intensity. Nevertheless this unintended admixture of the radiation from adjacent ranges does not exactly correspond to the best operating conditions for the analyzing receiving apparatus, particularly as far as extension, distribution and relation of the secondary ranges with regard to the primary range of radiation are concerned. The desired accurate light distribution over the unit confined by the scanning ray may be produced in the manner to be hereinafter set forth.

It is to be noted that Runge's correction formula is computed only for spectral graduations of intensity and may therefore be replaced by better formulæ, if it is to be applied to graduations or distributions of energy of a different nature. In the case of picture transmission of images having distinct and sharp contrasts in brightness, such as documents for instance, preferably other ratios of admixture of secondary energies and formulæ constituting more efficient combinations of correcting terms may be used. In order to provide for a convenient way of trying out the most favorable relations under consideration of the particular conditions prevailing, I prefer to make adjustable the rate of admixture and the rate of the correcting effects upon the sending apparatus as well as upon the receiving apparatus. Sometimes it is useful to combine several primary units with secondary units.

In the following an example shall be described which is based upon the above mentioned method $a$, and makes possible picture transmission with the aid of powerful energies.

In this example the image to be transmitted is formed by a transparent black-and-white picture through which the scanning ray of the sending station passes to a photoelectric cell on which rectified alternating current is impressed. The ray is intermittently cut off by a rotating perforated screen arranged in front of a source of light. A sending apparatus adapted for this purpose is shown in Fig. 17, only so much being shown as is necessary for a clear understanding of the invention.

The transparent picture to be transmitted which, as far as possible, must be free from grain, and which may either be black and white or suitably colored, is carried on the periphery of a transparent glass drum 2 supported in a well-known manner upon a threaded spindle 3 which is rotatably held by stationary threaded nuts and which is driven by any suitable means. During its rotation the drum is displaced in an axial direction. Enclosed in the drum 2 there are three photoelectric cells 4, 5 and 6 adjacent to each other. The cells are of any suitable construction, for instance, of the well-known type developed by Elster and Geitel. Three separate rays or beams 7, 8 and 9 scanning the picture or film along a helical line 10 are pointed toward the cells from different directions. Each beam 7, 8 and 9 is confined and directed by an individual slot system in such a manner as to be concentrated upon the line 10 in the form of a short line of light, the intensity of which decreases from the middle toward its ends. The means for confining and directing the beams comprise a common intense source of light 11, e. g., a tungsten filament lamp, lenses 12, 13, 14, totally reflecting prisms 15, 16 to divert the beams upon the three slots 17, 18 and 19, formed by suitable screens. In front of the source of light the above mentioned perforated rotatable screen 29 is arranged. 20, 21, 22 designate so-called wedged screens which are adjustable and serve to absorb variable parts of the light passing through the same, depending on their adjustment. 23, 24 and 25 are lenses which project optical images of the slots 17, 18 and 19 in the form of the above-mentioned lines of light upon the drum 2.

The three scanning lines of light 10 formed by the beams do not completely coincide but overlap each other, as diagrammatically shown in Fig. 18. The primary or central line of light generated by the central beam is represented by a rectangular parallelogram 26 in full lines. The overlapping secondary or adjacent lines of light produced by the oblique beams are shown as parallelograms 27 and 28 in dotted lines.

If each line or striped-shaped portion of the image is scanned by a plurality of overlapping lines of light, each of which is of decreasing intensity towards its ends, the three photoelectric receivers are influenced by an amplified energy in a similar manner as the three thermoelements 31, 32, 33 of Figs. 2a and 3, which are controlled by the powerful but blurred spectrum formed by a plurality of imaginary superimposed spectra displaced with respect to each other. With the arrangement of Fig. 2b, each of the thermoelements 31, 32, 33 is controlled not only by the small spectral radiance which would be active if an infinitely narrow slot were used, but owing to the width of the slot it is influenced also by part of the imaginary superimposed spectra of the adjacent spectral ranges of decreasing intensity. A mathematical analysis of the mixture of intensities has already been developed in 1897 by Paschen (compare the periodical "Annalen der Physik"). Owing to this mixed effect of adjacent ranges, a powerful energy is available for the generation of the spectrum or transmission or analysis of images, respectively. It is apparent from these considerations that each of the three photoelectric receivers 4, 5 and 6 in the present embodiment is exposed to a graded mixture of radiant intensity. This holds good even if the scanned portion of the image were homogeneous, since the rays of the middle part of the line of light constituting the scanned portion proper is increased by the amplifying rays of the lateral parts.

This additional energy is not lost in the course of the subsequent correcting control of the primary cell by the secondary cells, as a small fraction only of the correcting terms is combined with this primary energy (compare Formula 6).

The decrease in intensity along a line of light viewed from the centre of the line towards its ends may be provided for by placing in front of each of the slots 17, 18 and 19 (which are projected on a smaller scale on the drum 2 by means of the lenses 23, 24, 25), a photographically produced double wedge filler which in its center is pervious to that spectral range to which the cell is sensitive and absorbs said rays to an increasing degree towards its ends. The filter are preferably exchangeable or transversely displaceable with respect to the slot, and their transparency is graded in the direction of their displacement. Furthermore, screens having a confining opening may be inserted in the beams, e. g., 23, 24 and 25. In this manner the corrective fractions effective upon the secondary cells 4 and 6 may be varied many ways. Instead of using a single source of light, a plurality of separate adjustable sources could be employed. The corrective cooperation of the three photoelectric receivers may be accomplished in a comparatively simple manner.

The modulated alternating current delivered by the primary cell 5 is fed to the primary coil of a suitable transformer wound in a right-hand direction, while the modulated current delivered by the secondary cells 4 and 6 connected in shunt to each other is fed to a counteracting primary coil of the same transformer wound in a left-hand direction. The number of windings of the two coils is so designed that the left-hand coil is in the ratio of 1:7 to the right-hand coil. If these conditions are complied with, the combination of the correcting effects takes place in this part of the amplifying device without materially decreasing the powerful energy obtained by the action of the broad primary scanning beam.

Consequently, for the further amplification, transmission and reception, the same means and methods may be used which have been developed prior to my invention for the purpose of picture transmission, television, and the like. The step of obtaining the corrective current fluctuations for the desired energization of the transformer is carried out in the following manner: After a clear transparent spot of the film 1 has been brought to the scanned place, the secondary beams are put out and the strength of the alternating current delivered by the secondary transformer coil is measured. Then only the secondary beams are caused to pass through the transparent spot of the film and the alternating current is measured again with a view to ascertaining its ratio to the current flowing with the primary beam turned on. If the ratio does not amount to the desired value given by the correction formula (in case of Formula 6 it is 1:7), the secondary sources of light are so regulated until the desired ratio is obtained. It may be mentioned that the undesired influence of the light dispersed from the cells and interfering with the operation of the other cells may be eliminated by well-known optical means and by the use of materials which do not cause dispersion, e. g., films free from grain. With this object in mind I have found that preferably light of different colors may be used for the different beams, blue-green light, for instance, for the central primary beam, and yellow-green and red light for the secondary beams. Accordingly, for the primary cells an element is selected which is sensitive to the coordinated rays, such as potassium, while the secondary cells must be sensitive only to their respective rays and may contain rubidium or cæsium. Photoelectric cells sensitive to red rays have been developed by the General Electric Company. The three cells 4, 5 and 6 may be covered by light colored filters pervious only to their coordinated range of rays so as to absorb any interfering radiation. As a substitute for the three separate cells, a ring-shaped cell may be used as a secondary element which cell surrounds the primary cell.

This arrangement in which a plurality of scanning units and photoelectric receivers are mutually coordinated by means of rays having different wave lengths and, accordingly, different ranges of sensitivity, are of particular efficiency in such sending apparatus in which the scanning ray is reflected or dispersed by the image, as is the case, for instance, in the system developed by the Telefunken Company of Berlin.

In Fig. 19 I have diagrammatically illustrated a section of such an apparatus in which ring-shaped photoelectric cells of the kind used by Telefunken are arranged to permit scanning by means of overlapping primary and secondary scanning units. 30 designates again the drum supported by a threaded spindle and carrying on its circumference the picture 31 which in this case, however, is black and white, impervious to light. In front of the drum 30, two ring-shaped ovate cells 32 are arranged in concentric juxtaposition, both cells being sensitive to the rays of different color and being coated with light filtering substances on the side near to the drum. The primary, larger cell 32, may be coated, for instance, with a blue-green filter coat and may contain potassium sensitive to these short-wave rays. The secondary, smaller cell 33, sensitive to yellow and red, is also coated with a suitable filtering substance pervious to such rays. The intermittent main beam 34 confined by a slot is projected from the left through the color filter 42 and the ovate opening enclosed by the cells, while two oblique secondary beams 35 and 36 are so projected through color filters 41 and 43' upon the drum as to form thereon, together with the primary beam, three lines of differently colored light, the lines overlapping each other on the image 31 in the spot 43 in a similar manner as described heretofore in connection with the transmission of the transparent picture. The light reflected by the image is partially radiated upon the two cells 32 and 33, most of it being cast upon the primary cell 32 and the minor part only upon the smaller secondary cell 33. The latter constitutes the secondary receiver serving to furnish the relatively small energy for correcting the primary energy. For the purpose of clearly illustrating the arrangement, the ovate opening confined by the cells has been shown to be of substantial size. It is to be understood, of course, that for practical purposes the opening and the beams will be much smaller.

The walls of both cells near the drum are subjected to the diffuse dispersed reflected radiation of both kinds of rays, as is diagrammatically illustrated in Fig. 20. On account of the electric action of the coating provided on the cells and on account of the particular sensitivity of the cells to the respective rays, only those rays are active upon the cells which are respectively coordinated to the same. In other words, the primary cell 32 receives those rays only which originate in its coordinated primary source of light, and the secondary cell 33 is controlled only by the rays of the secondary beams. Each beam is concentrated upon the image at 43 in the form of a small line of light bright in its centre and decreasing in intensity towards its ends, the three lines overlapping each other. The two cells are connected to two coordinated counteracting primary windings of the transformer in the same manner as described in connection with the transmission apparatus for transparent pictures.

While the above embodiment has been described for the sake of simplicity as involving the use of three separate beams, obviously the same effect may be obtained by means of the arrangement shown in Fig. 21 in which a single slot 44 is used. This slot is covered with a light filter 46 having different shades of color and is reproduced on the drum 47 by means of a single beam 45. The filter 46 is of such nature that the projection of the slot on the film equals the projection formed by the cooperating three beams in the arrangement of Fig. 24. Such a filter may be manufactured by taking on a suitable scale a colored photographic picture of the colored line of light produced by the three beams in Fig. 19. Preferably, a series of interchangeable filters of that kind are produced. Instead of one filter, a combination of several differently colored filters may be used, or prisms may be employed to separate the rays and to filter out the desired wave length.

In the picture transmission system heretofore described, only those secondary ranges have been combined with the primary range which are situated in the direction of movement of the scanning point in accordance with the helical movement of that point. It is to be noted, however, that those picture units may also be combined with the primary range which are situated to the right and to the left of the path of the scanning point. This provides the possibility of increasing the width of said path and of a correspondingly increasing of energy. It follows that the units surrounding the scanned picture unit may be used for the corrective effect.

My invention is applicable also to the transmission of colored pictures. For this purpose the apparatus shown in Fig. 17 may be used with a few modifications. This may be done, for instance, by scanning the picture with three beams R, G, Bl arranged in the same horizontal plane diagrammatically shown in Fig. 22 and formed by red, green and blue rays, respectively. These three-colored beams operate upon three photoelectric cells IV, V and VI arranged in horizontal juxtaposition, each being sensitive only to its corresponding ray. The secondary ranges are scanned by a similar group of beams operating upon a coordinated group of cells I to III, or VII, VIII, IX, respectively. In each of these groups the cells are also arranged in horizontal juxtaposition. The scanning lines of light produced by the three groups of beams coincide with each other and may each correspond in structure to that described in connection with Fig. 17.

In the following, some examples of the other method (b) may be described in which the picture is scanned by means of an intermittent wide beam and with a strong energy resulting therefrom. The obliterated fluctuations (modulated high frequency) so generated are transmitted without previous correction, the correction being accomplished in the receiving station. In this case the scanning may also be accomplished by means of single line of light the intensity of which is increasing toward its ends in a similar manner as was the case with any of the lines of light which overlap each other in the arrangements shown in Figs. 17 to 19. The corrective transformation in the receiving station may be carried out in various manners. One possibility consists in recording the obliterated succession of energies on a photographic plate by means of any of the well known receiving apparatus which transform the transmitted modulated current into light fluctuations. The photographic record is subsequently subjected to a second photoelectrical scanning process by means of a multiple receiver comprising a primary receiver controlled by a primary picture unit equalling in size the range covered by the scanning beam in the sending station, and secondary receivers controlled by the secondary picture units adjacent to the primary unit. The modulated current obtained by the corrective combination of the primary effects and the secondary effects (e. g. in a transformer having several windings counteracting each other) controls a receiver which builds up the corrected picture by any suitable method. For this purpose anyone of the well known recievers may be used, e. g. a Carolus-Kerr cell. In this manner an accurate picture is obtained showing all the details which could not be obtained prior to my invention unless a very fine scanning beam of small energy were used.

The picture units scanned from the received and recorded image to control the primary and the secondary receiving elements need not overlap each other. They may be adjacent to each other in a manner analogous to the thermoelement tapes shown in Fig. 3 because the picture units of the original image have already been combined by the action of the wide scanning beam in the sending station and are transmitted to the receiving station in a form which may be compared with that of an obliterated spectrum.

The repeated scanning and the improved recording of the image in the receiving station does not cause particular difficulties in design or operation, especially when used for a continuous transmission of news, since both recording steps are accomplished in the same manner. Furthermore, strong energies may be used for the second transmission which is confined to the receiving station, and to a large extent the same source of energy and recording means may be employed. If the transmission plant is to be intermittently operated, the generation of the primary and of the secondary photoprints or images may be carried out in succession by means of the same apparatus.

A material simplification of the apparatus and a saving in time will obviously result from the fact that for the repeated scanning of the transmitted primary image in the receiving station, only a tiny unit of the image is required covering a primary range with the coordinated secondary ranges for controlling the second corrective receiver which builds up the corrected finished image.

Such a small portion of a spatially and temporally restricted line of the primary image may be realized by the use of inertia effects, or of phenomena connected with after effects or damping effects. These effects may be of thermal, mechanical, elastic, magnetic, electrical or chemical nature, primarily, however, of optical nature. For the purpose of illustrating this application of my invention, the use of the phosphorescent properties of certain materials (i. e. the property of glowing subsequently to radiation) is particularly adapted. In the following, embodiments of my invention based upon this phenomenon will be described.

In the investigations carried out by Lenard and others, numerous valuable ways have been discovered for producing such materials which are brightly glowing for different periods and with different intensities subsequently to radiation.

Furthermore, means have been found to extinguish the glowing and to control the color thereof. In order to produce by means of phosphorescent materials, a short primary line portion for subsequent scanning, the distorted and obliterated light fluctuations primarily generated in the receiving station by a suitable light controlling apparatus (e. g. such as developed by Carolus) and influenced by the electric impulses transmitted, are projected in a stationary point on a moving tape coated with the respective material. As a consequence of the exposure to which the material is subjected in that point, a glowing line extends from the same in the direction of the movement. This glowing line which represents an obliterated image of the line scanned in the sending station, is passed in front of a differentiating multiple photoelectric receiver which is controlled by three small sections of the line confined by three slots in a suitable screen. This is accomplished in such a manner that the central section, representing the primary unit, controls the primary measuring element, while the adjacent section representing the secondary units serves to control the adjacent secondary measuring elements. The latter are so connected with the primary element as to correct the effect thereof in the manner explained in the foregoing. Hence, it is obvious that the electric impulses generated by the combined measuring elements arranged along the glowing line, represent the refined succession of energy which may easily be transformed into an image. The transforming occurs in a second apparatus which builds up the image from the electric impulses. For this purpose the apparatus designed by Carolus may be used. The light fluctuations produced therein are composed into an image which may be recorded in a suitable manner or may be used for visual observation (television). An important advantage results from the fact that the second scanning requires but minimum energies and, consequently, no complicated amplifiers. The requirement of eliminating the undesired effects of light dispersed by the glowing phosphorescent tape upon the photoelectric cells which are preferably arranged in close proximity, may be satisfied by the utilization of the peculiar phenomenon that the generated radiation is of longer wave length than the generating radiation. Accordingly, a filter may be provided in front of the receiving cells protecting the same from the short wave radiation issuing from the Carolus cell.

Particularly efficient stimulations of the phosphorescense may be obtained by enclosing the phosphorescing substance in an evacuated receptacle and by subjecting the substance to an electric charge prior to the generating radiation, or by subjecting the substance to red or ultra-red rays subsequent to its treatment with the generating radiation. This radiation treatment with red rays has the effect of temporally increasing and subsequently extinguishing the glowing. As generating rays cathode rays or other rays emitted from gas may be used which may easily be controlled by the received electric impulses.

As a substitute for phosphorescent substances certain ionization products or products created by decay of certain substances may be used and deposited on a moving carrier. These products which are of short life may easily be influenced by electromagnetic waves and transformed into a condition in which they are capable of controlling the potential of another Kerr cell. This control may be performed by the combined action of a primary range and the adjacent secondary ranges. Other possible ways of transforming the received temporarily successive energies into spatially successive energies reside in the use of a moving thin ribbon of suitable material which is heated at successive points by the fluctuating electric current, and which is subsequently scanned by elements sensitive to changes in temperature. Instead of heating the ribbon the same may be magnetically energized in the manner of the well known magnetic sound records.

In the foregoing a method has been described which comprises; recording the distorted or obliterated received image and re-scanning the same for the purpose of the corrective reconstruction. I prefer, however, to carry out the correction (consisting in affecting the energy of the primary range by the energies of the coordinated secondary ranges) already in the course of the first construction of the received image. This may be accomplished, for instance, by directly transforming the fluctuating energy arriving at the receiving station and representing a temporal succession of energies corresponding to the spatially successive differences in light constituting the image. This transforming step comprises; affecting the energy arriving at a certain time by means of the energies arriving at a preceding and at a subsequent time. Obviously, the energies arriving at different times at the station cannot be combined, unless the first arriving energies are retarded until the last portion of the energy arrives. This, however, presents a simple problem which may be solved by a well known means of retarding the phase.

In the system of picture transmission employing so-called Carolus-Kerr cells, based upon the phenomenon of electric double refraction of light, the fluctuating voltage generated by the received electric impulses is imposed upon an electric condenser filled with a double refractive substance through which a beam of polarized light is projected. The fluctuations in voltage comprising the successive impulses cause corresponding changes in the polarization of the light in a manner which is free from inertia effects. Depending upon these changes, the beam is more or less forced to pass through polarization prisms arranged in its path and is as a consequence more or less absorbed by the same in accordance with the voltage fluctuations. In case of a very high transmission speed (as required for television of finely divided large images), the electric impulses representing successive units of the image follow each other in short spatial distances, particularly if conducted through conductor systems free from capacitive and inductive properties.

Three temporally successive impulses may be obtained by tapping the conductor at three successive points, the distance of which corresponds to the timed scanning process of the image. The tappings are connected with a Kerr cell comprising three double refractive condensers registering with each other to control the same beam. Each of these condensers is controlled by the current delivered from one of the taps. The largest central condenser is connected with the central tap furnishing the primary energy, while the two other condensers are controlled by the secondary energies tapped off at the two other points. These secondary condensers are turned through 90° relative to the main condenser, and for this reason, counteract the effect of the same. Furthermore, the secondary condensers are so dimensioned with regard to the primary condenser that they cooperate with the latter in the desired manner continuously to exert the correcting effect. Instead of arranging three separate Kerr cells which are energized by separate currents tapped off at different spatial points a single Kerr cell may be controlled by the three currents tapped off and correctively combined in a suitable apparatus. Instead of Kerr cells such apparatus may be used which depend upon the magnetic rotary polarization influencing the polarization of the beam. In methods in which the beams are confined by moving optical means such as mirrors or screens with openings, the primary and secondary energies may operate in combination with each other upon the same element, or may operate upon separate elements, which are cooperating with each other.

It is possible, for instance, to control a beam representing the primary energy by means of confining screens controlled by the secondary energies. Furthermore, the effect obtained by the primary beam may be corrected by secondary beams of different rays. If the primary beam acts upon a photographic plate, the effect may partly be counteracted by ultra-red rays having an extinguishing effect.

Briefly to reiterate the principle of my invention, I wish it to be understood that the corrective combination of the primary and the secondary impulses may be accomplished in any phase of the transmission process, for instance, in the sending, in the amplifying, etc. stages. In case the combination takes place in the receiver, the primary and the secondary energies may be separately sent from the sending station as separate fluctuating currents. If the sending is performed by modulated high frequency, different frequencies may be selected for sending the primary impulses and the secondary impulses. In the sending station the separate currents are combined with each other. It may be mentioned in this connection that my invention applies to such methods of picture transmission, in which the image is subdivided into a plurality of units. In one of these methods the image is formed by a film which conducts electric current to a degree which varies in accordance with the details of the image. This film is scanned by two brushes which move on one side of the film in registration with each other. The brushes form part of an electric circuit in which current is caused to flow dependent upon the conductive properties of the point scanned. It is obvious that in this case my invention may be carried out by providing additional pairs of terminals or brushes scanning the adjacent points. The currents flowing through these secondary circuits are combined with the primary current in the manner heretofore explained. An overlapping of the ranges scanned may be performed by a suitable mutual positioning of the brushes.

While in the preceding examples the refined analysis of only such objects has been treated which are situated in a plane, such as a flat picture, my invention is applicable in a similar manner to the transmission of pictures illustrating objects of the third dimension. In this case my invention provides the possibility of avoiding the well known difficulty of obtaining a sharp picture by means of a lens having a large diameter with respect to its focal distance. This difficulty may be avoided by analyzing secondary picture units situated in planes spaced from the plate of the primary units and situated in front and behind the latter. By combining the results obtained in the analysis of the primary and the secondary planes the desired refinement in the representation may be obtained and at the same time lenses of large diameter may be used.

Another important field to which my invention is applicable is the method of translating the succession of acoustic energies or impulses into a corresponding succession of optical fluctuations which are subsequently recorded on a light sensitive film, for instance on the marginal range of a movie picture film, as is well known in the art of talking movie pictures or of recording sounds for subsequent manufacture of record plates. The reproduction of the sound is accomplished by feeding the film past a slot through which a ray is projected. The ray is controlled by the film to produce light fluctuations which are translated into corresponding current fluctuations which are eventually translated into acoustic oscillations. Such sound record films may be compared with the heretofore discussed spectral records as far as the fluctuations in intensity and the obliteration of the succession to be recorded are concerned. Even a small departure from the correct succession of different transparencies in the film cause serious disturbances, particularly in complicated sound compositions, for instance female voices, treble sounds, orchestra music, and choirs of many voices.

As in case of movie pictures the speed of the film is limited depending, as it does, on the number of pictures per second, the space available for recording sounds of the highest frequency which determine the quality of the reproduction of treble sounds, amounts to but $$\frac{1}{48} m/m.$$

When a single ray produced by a narrow slot is used in the manufacture of the film and the reproduction of the sound as it has been the general practice prior to my invention, numerous difficulties and disturbances result from the small energy available and from the influence of the grain of the light sensitive layer of the film. Owing to the small energy a strong amplification is required causing unavoidable distortions. If the lens inserted between the slot in the film is dimensioned as large as possible to increase the intensity of radiation, the slightest changes in the distance between the lens and the film cause serious disturbances. On the other hand, a larger energy could not be provided for by an increase of the width of the slot because this would result in the same obliterations which have been discussed heretofore in connection with the spectroscopic application of my invention.

In order to avoid these disadvantages resulting in a distorted sound reproduction, according to my invention secondary ranges may be combined as corrective terms with the primary range in a similar manner as in the spectral analyzation whereby the spatial and temporary overlapping effect caused by the use of a broad slot and a broad controlling range in the reproduction may be compensated for.

Also in this case the corrective effect may directly be obtained in suitably constructed receivers similar to the photometry of special photo-pictures, or the corrective effect may be produced in the course of any other stage of the method. If the optical fluctuations for recording the sound are produced by a source of light controlled by microphone currents, the secondary effects may be combined with the primary effect in the amplifier or this combination may be accomplished by a suitable construction of the microphone in which the overlapping of the secondary impulses is directly obtained.

If the optical fluctuations are produced by means of a reflector directly controlled by the acoustic oscillations, the additional controlling effect of the secondary ranges upon the reflector may be exerted by mechanical, electric or electro-magnetic cooperative connections. In the reproduction of the sound from the record film by photoelectric means translating the differences in transparency of the film into current oscillations, and the latter into acoustic oscillations, the corrective combination of the secondary ranges with the primary range may be performed in any one of the various stages.

This does not only offer the advantage that the sound record may be left un-refined to a certain degree, and that changes in the distance of the film from the projecting lens are of minor consequence, but strong light intensities may be used for the recording stage as well as for the reproduction of the sound from the record, which is of particular importance, if the current fluctuations produced from the record are to operate an engraving needle for the manufacture of a record plate. As in this case a positive control of the needle may be obtained without an excessive amplification. Another advantage resides in the possibility of crowding the acoustic record on the field so that even a film comprising a small number of pictures per second only affords sufficient space for satisfactory sound records which is obviously of high economical importance.

In Fig. 23 I have shown an apparatus for reproducing talking movie pictures in which the corrective principle according to my invention is applied, the essential parts only being shown for sake of simplicity. The film 6 wound round a roll 5 and drawn from the same by a suitable roll 7 is provided on its lower portion with the pictures to be projected on the screen by means of a suitable projection apparatus not shown. The coordinated sound record is formed by a photographic nontransparent layer on the upper portion of the film which covers the entire half of the film in places in which the sound intensity equals zero and covers the upper margin only of the film in places expressing powerful sound intensity. It may be assumed that the graduation in the transparency of the layer expressing the sound oscillation is obliterated similar to an obliterated spectrum owing to an overlapping of the temporarily successive effects. In order to translate this obliterated succession of different transparencies of the layer into the corresponding refined succession of acoustic impulses, I expose not only a narrow vertical stripe to the sound reproducing ray $a$ as it has been the practice prior to my invention, but, in addition thereto, project secondary rays $b$, $c$ through secondary ranges adjacent to said stripe in a similar manner as described in connection with the analyzation of an obliterated spectral photographic record. The effect produced by the secondary rays is correctively combined with the primary effect in the substractive manner explained in connection with the other applications of my invention.

The projecting rays are produced by means of a suitable source of light 1, a collecting lens 2 projecting the beam of light upon a screen 3 having a relatively wide vertical slot. The slot is covered with a colored light filter comprising a vertical central portion transparent to blue and green rays and lateral portions transparent to yellow and red rays. The lens 4 collects the beam issuing from the slot of screen 3 and projects the same upon the film 6 so that the blue and green rays penetrate the sound recording layer on the film along a vertical line, while the red and yellow rays pass through said layer on both sides of that line. It is to be understood, of course, that the term "line" is not to be taken in the mathematical sense as the line has a substantial width corresponding to the breadth of the blue green portion of the afore-mentioned colored filter.

The three rays or beams penetrating the layer to an extent depending upon the transparency in that particular place are preferably cast upon a prism 8 covered on its back with a colored filter 9 pervious to blue and green rays. The major part of the rays passes through the filter 9 to a photoelectric cell 12 containing potassium highly sensitive to blue and green rays. This cell, consequently, is exclusively controlled by that beam which passes through the central portion of the scanned range of the film. A part of the rays is reflected on the front of the prism 8 and transverses a light filter 10 pervious to red and yellow light to control a photoelectric cell 11 sensitive to yellow and red light. Hence, this cell is influenced by both secondary rays b and c passing through the secondary ranges of the film. To insure the reflection of a substantial part of the rays on the front of the prism 8 the same is preferably covered with a slightly reflecting layer. If the photoelectric cells are operated with the direct current voltage and controlled by intermittently interrupted rays of so high a frequency that the frequency of the generated electric impulses may be amplified without interfering with the acoustic frequency to be transmitted, the fluctuating currents furnished by the primary cell and the secondary cell may be combined in a transformer having counteracting windings similar to those described in connection with the embodiments relating to picture transmission. In the transformer the secondary effects correct the primary fluctuations. The transformer may form part of an amplifier.

If a resistance amplifier is used instead of a transformer amplifier, for instance of the type described by Schröter in the periodical "Electrotechnische Zeitschrift", 1926, page 719, Fig. 3, the corrective influence of the secondary cell upon the fluctuation current delivered by the primary cell may be effected by connecting the secondary cell in shunt to the grid resistance leading off the grid charge of the first amplifier tube. If with such a connection the secondary cells receive a stronger optical energy, they offer a smaller resistance to the grid charge and, consequently, lead off a larger portion of the same. This effect counteracts the effect of the primary cell. Another possibility resides in substituting the grid resistance by the secondary cell which in this case would have to be designed to be of small capacity. In order to ensure a permanent leading off effect, the cell is to be subjected to an auxiliary permanent exposure ensuring permanent conductibility.

Instead of a single beam of different colored rays and instead of subsequently separating the rays, an arrangement similar to that shown in Fig. 22 may be used in which beams are projected from different directions, or an arrangement similar to that shown in Fig. 9 may be provided in which the secondary beams are diverted by reflectors after having passed the film.

In accordance with the explanations given with regard to the Fig. 22—24 relating to picture transmission involving a correct translation of an unobliterated succession of optical energies into corresponding current fluctuations by means of an increased scanning energy, it may be easily comprehended that such a method of operating with overlapping scanning ranges is also applicable to the production of a correct unobliterated sound record film.

When making use of the principle on which the invention is based there are obtained on the branches of industry and science mentioned, besides the increase of the value, the following economical advantages:

When transmitting sounds or pictures, an increased intensity and speed of the transmission can be attained without any diminishment of the fineness of the reproduction; the range of transmission is extended and amplifying apparatus can be saved. The solution of the television problem is essentially promoted, and the refinement attainable renders it possible to transmit in a given period of time considerably more communications or considerably more pictures on the same space as hitherto; the apparatus can be smaller, simpler, and cheaper, and also savings in material are obtained. This is likely to be of decisive economical advantage in the case of speaking films and of remote cinematography, also as regards the better sparing of the materials.

With the method in which the transmission of the succession of appearances is effected by carrying waves or by the modulations thereof, as is the case for instance in broadcasting, the wireless transmission of pictures, and the like, the invention seems likely to present the important possibility of employing smaller ranges of frequency and to work, consequently, with a larger number of transmitters at a time, for instance on account of the possibility of using less sharply stamped successions of curves in which the harmonics, which are very important for the range of frequency, appear in a smaller measure.

When utilizing the new method for sound disks, it seems likely that, besides the improved sound reproduction or the greater intensity of the sounds, the sound succession can be compressed locally, whereby space will be gained for longer reproductions. Not less important is the greater spacing, especially for more sensitive curve parts, as obtained by the now possible mitigation of the sharply pointed parts of the harmonics, and furthermore, the possibility to make use of the correction members also for separate purposes, as, for instance, intensifying amplifying effects. Supplementing the optical examples, attention may be called to the more general possibility of correcting blurrings and obliterations originating from optical or physiological deficiencies or disturbances by means of similar remedies, for instance, in television methods, stereoscopic moving pictures or photography in natural colors, with abrupt successions of pictures. This is particularly the case when lenses of large diameter are to be used and when the resulting disadvantages were to be taken as unavoidable prior to my invention.

With regard to the utilization of my invention for measuring instruments, it may be mentioned that even inertia effects of measuring devices and relays with chemical function or with electric space charges, for instance, as designed by Johnson Rabek, or with emission of electrodes, may be eliminated or reduced in a similar manner by combining spatially or temporarily successive ranges.

The possibility heretofore discussed of combining larger ranges without affecting the fineness of the analyzation results in essential and important improvements with regard to inertia effects in so far as the essentially increased energy from the larger ranges permits a more rapid adjustment.

As a further development of my invention I contemplate the possibility of deriving the individual terms which are to be combined for the temporary correction, from a similar combination of spatially differentiated terms. Such a temporary and spatial analysis may be useful for increasing the accuracy of registering photometers with measuring instruments and for simultaneously increasing their speed in operation. Furthermore, it may be useful to employ secondary devices with overlapping scanning fields, or times, respectively. For the purpose of keeping secrets or for multiple transmissions or for separating a plurality of effects, temporary or spatial effects which are far spaced from each other may be mixed with each other and are subsequently dissolved in accordance with my invention to reproduce the obliterated details.

What I claim is:

1. In an analyzing system, an analyzing slot, means for positioning said slot in registry with any desired portion of the object to be analyzed, means for translating the characteristics of a portion of said object in registry with said slot into thermoelectric currents, the last mentioned means comprising a thermoelectric element centrally positioned with relation to said slot and supplementary thermoelectric elements laterally displaced with relation to the slot center.

2. A system according to claim 1 characterized by the fact that all of said thermoelectric elements are connected in series.

3. A system according to claim 1 characterized by the fact that the supplementary elements are connected to the central element so that the combined effect of the supplementary elements is of the order of one-fourteenth of that of the central element but in an opposite sense.

4. A system according to claim 1 characterized by the fact that each thermoelectric element is formed of a different set of thermoelectric materials.

5. Means for analyzing spatially or temporally successive units of energy forms comprising an analyzing slot, a radiation responsive element mounted in the central portion of said slot, said element having a width corresponding to that of the unit under analysis, a supplementary radiation responsive element mounted adjacent to said slot so that the radiation passing between the first mentioned element and the walls of the slot is of the order of one-fourteenth of the radiation affecting the first mentioned element, and means for combining the radiation effects on said first and second mentioned elements to compensate for the integrating action due to the size of the analyzing slot.

6. In a system for analyzing spatially or temporally successive energy forms, a main resolving aperture, supplementary adjacent resolving apertures, each of said apertures having a width corresponding to a predetermined unit area of the object being analyzed, said main aperture being positioned before the area under analysis, means for recording the radiation from the unit area under analysis and passing through said main aperture, means for recording the radiations passing through the supplementary apertures from areas of the object adjacent to the area under analysis, and means for combining said records to produce a record of the true value of the unit under analysis which is substantially free from the undesirable effects introduced by the finite dimensions of the main aperture.

7. In a system for analyzing spectra or the like, an analyzing light beam, a member carrying the element to be tested and positioned in the path of said beam, a light responsive element excited by the rays passing from said source, means for selecting a restricted band of light passing from said element, means for selectively exciting said light responsive element alternately by the central portion of the band and by lateral portions thereof, and means for correcting the response of said element to excitation by the central portion to an extent determined by the excitation of the lateral portions.

8. A system according to claim 7 characterized by the fact that the means for selectively exciting the light responsive element includes a revolving prismatic drum.

9. A system according to claim 7 characterized by the fact that the means for selectively exciting the light responsive element includes a drum carrying a plurality of spaced refracting but non-dispersing prisms.

10. A system according to claim 7 characterized by the fact that the means for selectively exciting the light responsive device includes sets of spaced refracting prisms mounted on an inclined drum, one prism of a set adapted to select certain lateral rays and the other to select other lateral rays, the central rays passing through the space between the prisms.

11. A system according to claim 7 characterized by the fact that the selective means comprises a rotating prismatic drum adapted to time the exciting of the light responsive element by the central and lateral rays.

12. A system according to claim 7 characterized by the fact that the light responsive means is connected to a measuring instrument and a reversing switch, and that the selective means includes revolving sets of prisms, one prism of each set selecting one lateral set of rays and the other prism selecting another lateral set of rays for exciting the responsive element, and means for holding said switch in one position when the central portion of the rays is exciting the responsive element and for reversing said switch when the lateral rays are exciting the responsive element.

13. A system according to claim 7 characterized by the fact that the means for selecting exciting comprises a reciprocating slot which alternately selects the central range of the said restricted band and the lateral ranges for exciting the light responsive device.

14. A system according to claim 7 characterized by the fact that said responsive means includes a photoelectric cell.

15. In a system for measuring spectra, a plurality of spectroscopes, an analyzing screen having a slot therein, means for projecting the radiations from each spectroscope upon opposite sides of said screen with the central portion of each radiation intersecting and passing in opposite directions through said slot, means including opposite faces of said screen for combining the central portion of one radiation with portions of the other radiation adjacent and lateral to the central portion of said other radiation and vice versa, and means for comparing the radiations thus cross-combined.

16. The method of analyzing spectra which comprises making through a spectroscopic gap of width $a$ a photographic positive of the directly measured intensity corresponding to the wave length $E\lambda$ representing the primary amount of radiation, making a plurality of photographic negatives of the spectra but at a reduced exposure, superposing the coordinated points $\lambda+a$ in one and $\lambda-a$ in another negative on $\lambda$ in the positive, the offsetting corresponding to the degree of definition required in the analyzation, and measuring the radiation from each elemental area of the superposed positive and negative.

17. In a system for analyzing spatially or temporally successive units of energy wave forms employing a finite resolving medium, the method of compensating for the undesired effects produced by the finite dimensions of said medium which comprises analyzing the characteristics of each elemental unit of the energy wave forms under analysis by causing a variably operable device to respond thereto, simultaneously analyzing the characteristics of two adjacent units by causing a second variably operable device to respond to one and a third variably operable device to respond to the other adjacent unit, translating by means of the three devices the wave forms under analysis into other energy wave forms, deducting from the translation corresponding to the first mentioned device the translation corresponding to the second device, and adding thereto the translation corresponding to the third device to compensate for the deviation of the first device from the theoretically correct translation.

CARL MÜLLER.